(12) United States Patent
Wong

(10) Patent No.: US 12,549,951 B2
(45) Date of Patent: Feb. 10, 2026

(54) METHOD AND APPARATUS FOR INTERACTIVE GUIDED GESTURE BLUETOOTH® PAIRING AUTHORIZATION AND PASSCODE ENTRY CAPTURE FOR PAIRING AN INFORMATION HANDLING SYSTEM WITH A PERIPHERAL DEVICE

(71) Applicant: Dell Products, LP, Round Rock, TX (US)

(72) Inventor: Kai Leong Wong, Singapore (SG)

(73) Assignee: DELL PRODUCTS LP, Round Rock, TX (US)

( * ) Notice: Subject to any disclaimer, the term of this patent is extended or adjusted under 35 U.S.C. 154(b) by 277 days.

(21) Appl. No.: 18/143,355

(22) Filed: May 4, 2023

(65) Prior Publication Data

US 2024/0373231 A1  Nov. 7, 2024

(51) Int. Cl.
| | |
|---|---|
| H04W 12/50 | (2021.01) |
| G06F 3/01 | (2006.01) |
| G06F 3/0354 | (2013.01) |
| G06F 3/04842 | (2022.01) |
| H04W 12/06 | (2021.01) |

(52) U.S. Cl.
CPC ............ *H04W 12/50* (2021.01); *G06F 3/017* (2013.01); *G06F 3/03543* (2013.01); *G06F 3/04842* (2013.01); *H04W 12/06* (2013.01)

(58) Field of Classification Search
CPC ....... H04W 12/50; H04W 12/06; G06F 3/017; G06F 3/03543; G06F 3/04842; G06F 2203/0384
See application file for complete search history.

(56) References Cited

U.S. PATENT DOCUMENTS

| | | | |
|---|---|---|---|
| 8,539,550 B1 * | 9/2013 | Terres | G06F 21/31 726/16 |
| 8,739,035 B2 | 5/2014 | Trethewey | |
| 8,756,532 B2 * | 6/2014 | Poon | G06F 3/04883 345/173 |

(Continued)

FOREIGN PATENT DOCUMENTS

| | | | | |
|---|---|---|---|---|
| KR | 2016-0034399 A | * | 10/2017 | ............ G06F 3/017 |
| WO | 2022/047968 A1 | | 3/2022 | |

*Primary Examiner* — Aftab N. Khan
(74) *Attorney, Agent, or Firm* — Prol Intellectual Property Law, PLLC; H. Kenneth Prol

(57) ABSTRACT

An information handling system includes a hardware processor and a memory device to execute code instructions of a guided gesture authorization security exchange system to communicate via a wireless interface adapter with a wireless peripheral device to initiate a preliminary secure exchange communication for a pairing process. The hardware processor also executes computer readable program code of a user interaction guided gesture instruction system to generate an interactive graphical user interface at a display device to present to a user guided gesture instructions for the user to provide, at the wireless peripheral device, a guided gesture on the wireless peripheral device used as the pairing authorization passcode entry information that indicates the pairing process is accepted by the user if a match is determined. The wireless interface adapter pairs and operably couples with the wireless peripheral device upon receipt of the pairing authorization passcode entry information that matches.

20 Claims, 10 Drawing Sheets

(56) References Cited

U.S. PATENT DOCUMENTS

| | | | | |
|---|---|---|---|---|
| 8,850,045 | B2* | 9/2014 | Berg | H04W 12/50 |
| | | | | 709/225 |
| 9,014,681 | B2* | 4/2015 | Nakazawa | H04W 76/10 |
| | | | | 455/418 |
| 9,218,122 | B2* | 12/2015 | Thomas | G06F 9/4451 |
| 10,104,183 | B2* | 10/2018 | Bathiche | H04W 12/06 |
| 2008/0092043 | A1 | 4/2008 | Trethewey | |
| 2013/0165098 | A1* | 6/2013 | Nakazawa | H04W 12/04 |
| | | | | 455/418 |
| 2013/0169550 | A1* | 7/2013 | Gai | H04W 4/80 |
| | | | | 345/173 |
| 2014/0006954 | A1* | 1/2014 | Raffa | G06V 40/20 |
| | | | | 715/733 |
| 2014/0304004 | A1 | 10/2014 | Trethewey | |
| 2015/0128255 | A1* | 5/2015 | Kuscher | G06F 21/36 |
| | | | | 726/19 |
| 2015/0154394 | A1* | 6/2015 | Kapinos | G06F 21/31 |
| | | | | 726/19 |
| 2015/0373543 | A1 | 12/2015 | Rivera | |
| 2016/0337346 | A1* | 11/2016 | Momchilov | G06F 21/34 |
| 2017/0094510 | A1 | 3/2017 | Khosravi | |
| 2018/0011546 | A1* | 1/2018 | Holz | G06F 3/017 |
| 2018/0293081 | A1 | 10/2018 | Trethewey | |
| 2020/0218486 | A1* | 7/2020 | Behzadi | G06F 3/14 |
| 2025/0111019 | A1* | 4/2025 | Roscoe | G06F 21/36 |

\* cited by examiner

METHOD AND APPARATUS FOR INTERACTIVE GUIDED GESTURE BLUETOOTH® PAIRING AUTHORIZATION AND PASSCODE ENTRY CAPTURE FOR PAIRING AN INFORMATION HANDLING SYSTEM WITH A PERIPHERAL DEVICE

FIELD OF THE DISCLOSURE

The present disclosure generally relates to pairing a peripheral device with an information handling system. The present disclosure more specifically relates to authorizing Bluetooth® secure pairing using interactive gestures at the wireless peripheral device.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. Still further, information handling systems may be operatively coupled to, via a pairing process, various peripheral devices that allow a user to interact with the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
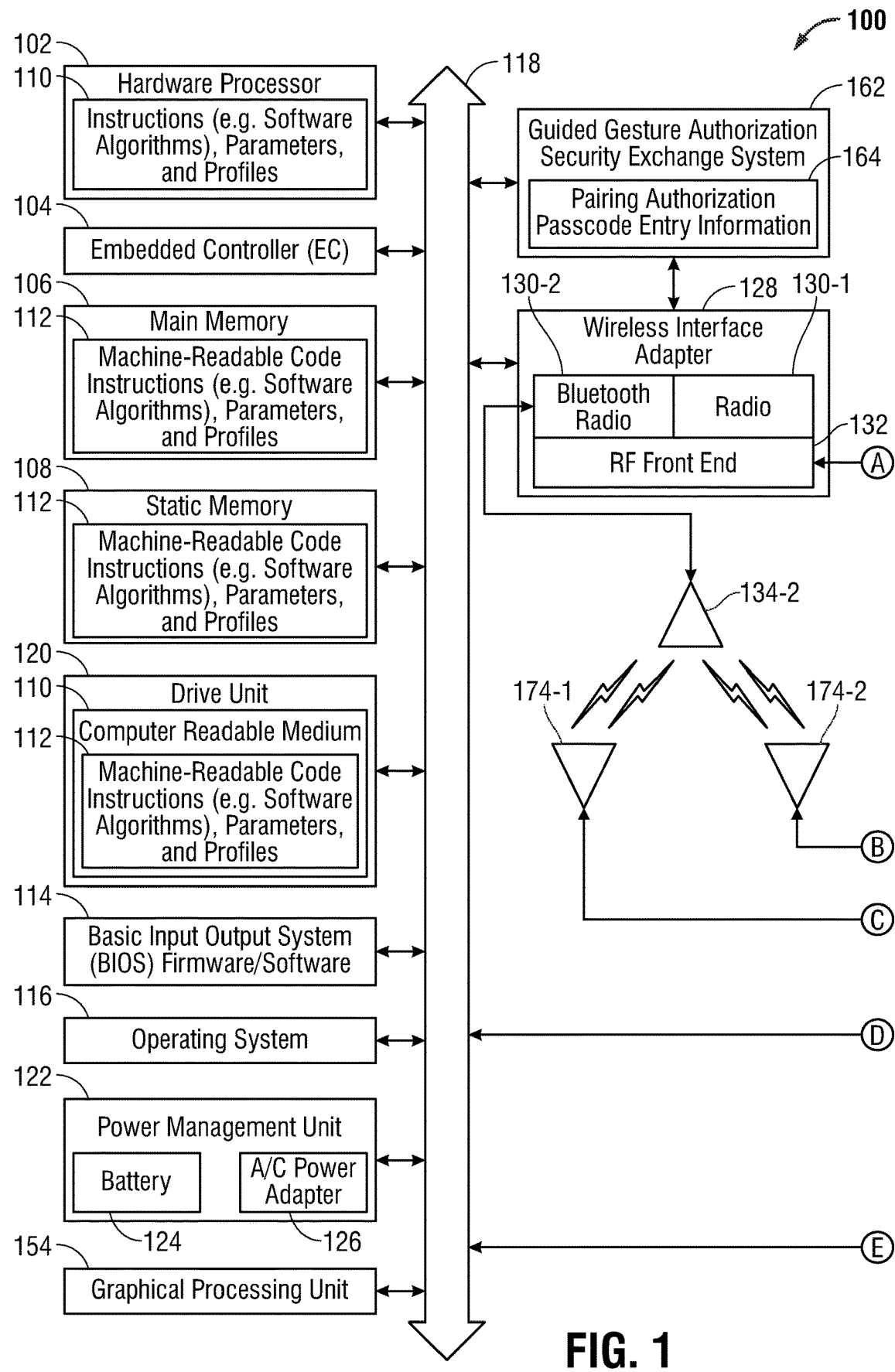
FIG. 1 is a block diagram of an information handling system and a wireless peripheral device including a guided gesture authorization security exchange system used to engage in a guided gesture-based authorization security exchange handshaking process with a wireless PD to pair the information handling system to the wireless PD according to an embodiment of the present disclosure.
Figure 1:
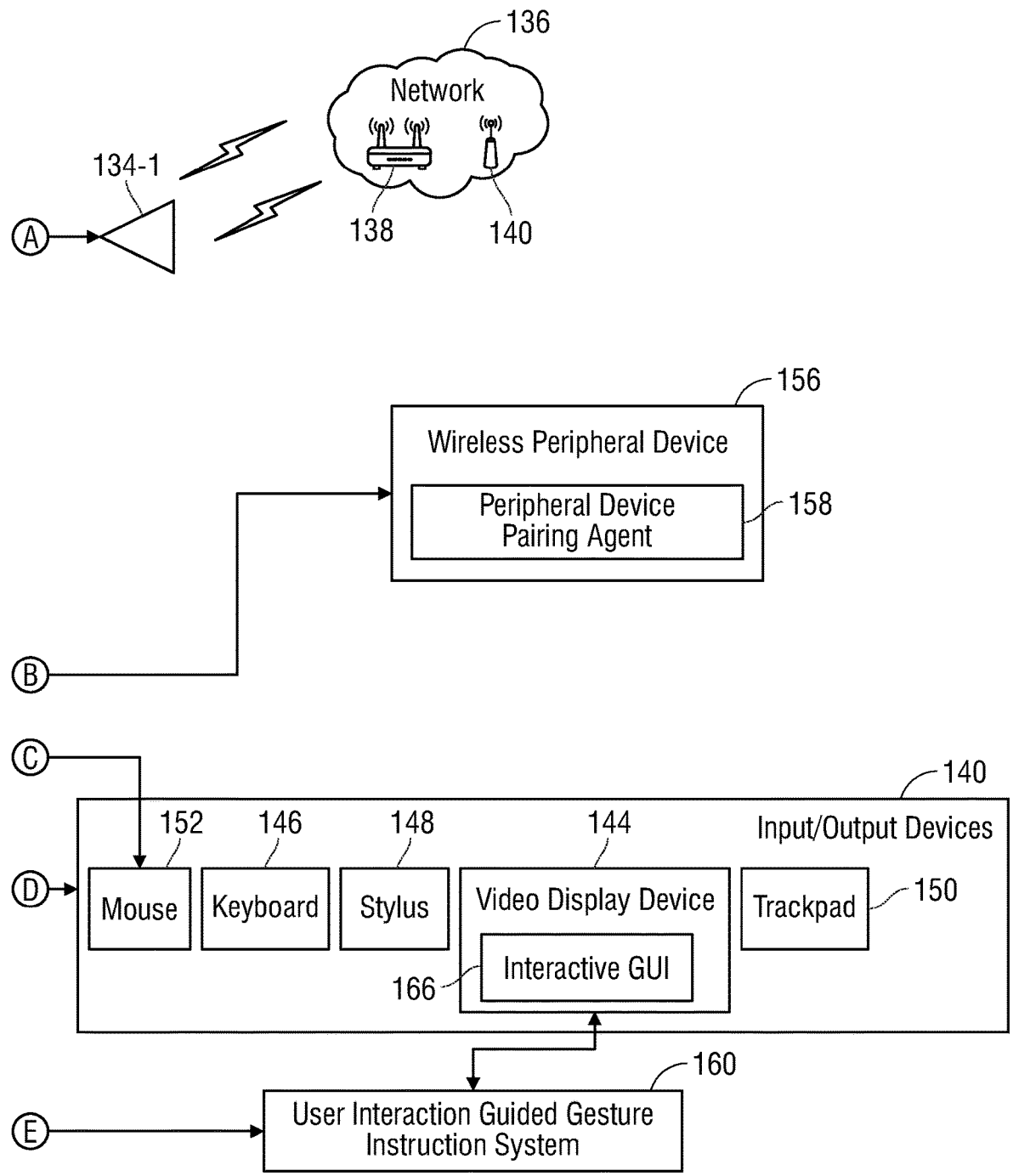

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems operate to provide computing, data storage, and application resources among other computing resources. A plurality of peripheral devices may be operatively coupled, wirelessly, to the information handling system such as via a Bluetooth® (BT) wireless protocol. The wireless peripheral devices allow the user to interact with the information handling system by receiving output and proving input to the information handling system. Some peripheral devices may serve as both input and output devices. Although some peripheral devices may have a wired connection with the information handling system, wireless peripheral devices are operatively coupled to the information handling system via a radio of a wireless interface adapter in the information handling system and a radio located within the wireless peripheral devices, for example BT wireless systems. In order to allow for the operative coupling of a wireless peripheral device to the information handling system, the wireless peripheral device may initiate a pairing process. This pairing process includes security protocols that securely couple the wireless peripheral device to the information handling system. In some instances, this pairing process requires user input to initiate the pairing process (e.g., not being automatic). The pairing process, including the exchange of security protocol data, does not initiate until the user has provided input to the information handling system indicating that the pairing process should continue. However, man-in-the-middle (MIM) attacks could occur where the process of pairing requires a simple acceptance or aborting of the pairing process at the information handling system. Still further, in some embodiments, the information handling system may not include an input device that could be used to interact with the graphical user interface (GUI) presented to the user in order to accept or abort the pairing process.

The present specification describes an information handling system that includes a hardware processor, a memory device, and a power management unit (PMU) to provide power to the hardware processor and memory device. The information handling system may be available to pair with a wireless peripheral device (PD) when the user has confirmed the pairing process. In an embodiment, the hardware processor executes computer readable program code of a guided gesture authorization security exchange system to communicate with a wireless peripheral device to initiate a preliminary secure exchange communication and to receive pairing authorization passcode entry information used to operatively couple the wireless peripheral device with the information handling system. In an embodiment, this preliminary secure exchange communication may be created, over a generic attribute profile (GATT) communication channel, in order to establish this preliminary secure exchange communication used to receive gesture input data from the wireless PD that matches anticipated user interactions based on a subsequently-provided interactive graphical user interface (GUI) to a user via a video display device of the information handling system. The interactions by the user at the wireless PD executing one or more guided gestures as elicited by the interactive GUI on the video display device of the information handling system are translated, at the wireless PD, into gesture input data that is transmitted to the information handling system via the secure GATT communication established in the preliminary secure exchange communication. This gesture input data is used to generate the pairing authorization passcode entry information to authenticate pairing.

In an embodiment, the hardware processor also executes computer readable program code of a user interaction guided gesture instruction system to generate an interactive graphical user interface (GUI) and cause the interactive GUI to be presented to a user for the user to provide guided gestures used to indicate confirmation that the pairing process is accepted by the user via the preliminary secure exchange communication. It is this interactive GUI presented to a user that elicits the gesture input data at the wireless PD with detection of one or more guided gestures and that gesture input data is transmitted to the information handling system. In an embodiment, the gesture input data may be generated from timed or sequenced guided gestures at the interactive GUI 166.

In an embodiment, the hardware processor executing computer readable program code of the user interaction guided gesture instruction system generates an interactive GUI that presents a target marker and a moving matching marker for the user to provide guided gesture actuations, via the wireless peripheral device, when the target marker and matching marker are aligned within the interactive GUI. In an embodiment, the hardware processor executes the computer readable program code of the guided gesture authorization security exchange system to provide an encrypted and randomly-generated time offset value to the wireless peripheral device indicating, to the wireless peripheral device, when a timer is to provide a timing window indicating when, on the interactive GUI, the target marker is aligned with the matching marker.

In an embodiment, the hardware processor may execute computer readable program code of the user interaction guided gesture instruction system generates the interactive GUI that presents a randomized sequence of numbers and a target marker placed at a location along the randomized sequence of numbers for the user to provide guided gestures from interaction with the wireless peripheral device by providing guided gesture actuations to select the target marker. In an embodiment, the guided gesture actuations at the wireless peripheral device (e.g., interactions by the user at the wireless peripheral device) provides gesture input data from the wireless peripheral device that then encodes the gesture input data to be received at the information handling system and decoded to determine whether the gesture input data serves as pairing authorization passcode entry information when it matches corresponding location of the target marker along the randomized sequence of numbers.

In an embodiment, the hardware processor executes computer readable program code of the user interaction guided gesture instruction system to generate the interactive GUI that presents a randomized target marker direction placed at a location on the interactive GUI for the user to provide guided gestures at the wireless peripheral device to select the randomized target marker direction. Other display indicators and instructions may be displayed via the GUI for guided gesture instructions in other embodiments. In an embodiment, plural randomized target marker direction or a plurality of other guided gesture are sequentially displayed a plurality of times for the user to interact with the wireless peripheral device to provide a sequence of guided gestures as gesture input data that is encoded by the wireless peripheral device and sent to the information handling system and decoded to determine whether the gesture input data serves as pairing authorization passcode entry information when it matches corresponding randomized target marker directions provided as guided gesture instructions at the interactive GUI.

FIG. 1 illustrates an information handling system 100 similar to information handling systems according to several aspects of the present disclosure that is operatively couplable to a wireless peripheral device (PD) 156 as described herein. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a convertible laptop, a tablet, a smartphone, a communications device, an access point (AP), a base station transceiver, a wireless telephone, a control system, a camera, a scanner, a printer, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video, or data communication. For example, an information handling system 100 may be any mobile or other computing device capable of executing a set of instructions (sequential or otherwise) that specify actions to be taken by that machine. In an embodiment, the information handling system 100 may be operatively coupled to a server or other network device as well as paired and operatively coupled with any wireless peripheral devices. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include memory (volatile (e.g., random-access memory, etc.), non-volatile (read-only memory, flash memory etc.) or any combination thereof), one or more hardware processing resources, such as a central processing unit (CPU), a graphics processing unit (GPU) 152, an embedded controller (EC) 104, a hardware processor 102, hardware controllers, or any combination thereof. Additional components of the information handling system 100 can include one or more storage devices, one or more communications ports for communicating with external devices, as well as various input and output (I/O) devices 140, such as a keyboard 144, a mouse 150, a video display device 142, a stylus 146, a trackpad 148, or any combination thereof. In an embodiment, these I/O devices 140 may be wired or wireless. The information handling system 100 can also include one or more buses 118 operable to transmit data communications between the various hardware components described herein. Portions of an information handling system 100 may themselves be considered information handling systems and some or all of which may be wireless.

Information handling system 100 can include devices or modules that embody one or more of the devices or execute instructions for the one or more systems and modules described above, and operates to perform one or more of the methods described herein. The information handling system 100 may execute machine-readable code instructions 110 via the described hardware processing resources that may operate on servers or systems, remote data centers, or on-box in individual client information handling systems according to various embodiments herein. In some embodiments, it is understood any or all portions of machine-readable code instructions 110 may operate on a plurality of information handling systems 100.

As described herein, the information handling system 100 may include hardware processing resources such as a hardware processor 102, a central processing unit (CPU), accelerated processing unit (APU), an embedded controller (EC) 104, a neural processing unit (NPU), a vision processing unit (VPU), a digital signal processor (DSP), a GPU 152, a microcontroller, or any other type of hardware processing device that executes code instructions to perform the processes described herein. Any of the hardware processing resources may operate to execute code that is either firmware or software code. Moreover, the information handling system 100 can include memory devices such as main memory 104, static memory 106, computer readable medium 108 storing instructions 110 of, in an example embodiment, a fan cooling system (e.g., controlled by a power management unit (PMU) controller), or other computer executable program code, and drive unit 120 (volatile (e.g., random-access memory, etc.), nonvolatile (read-only memory, flash memory etc.) or any combination thereof). These memory devices may be accessed by any of the hardware processors described herein to access computer-readable program code of a guided gesture authorization security exchange system 162, user interaction guided gesture instruction system 160, or wireless interface adapter 128, including an operating system Bluetooth® (BT) stack of the wireless interface adapter 128.

As shown, the information handling system 100 may further include a video display device 142. The video display device 142, in an embodiment, may function as a liquid crystal display (LCD), an organic light emitting diode (OLED), a flat panel display, or a solid-state display. Although FIG. 1 shows a single video display device 142, the present specification contemplates that multiple video display devices 142 may be used with the information handling system to facilitate an extended desktop scenario, for example. Additionally, the information handling system 100 may include one or more input/output devices 140 including an alpha numeric input device such as a keyboard 144 and/or a cursor control device, such as a mouse 150, touchpad/trackpad 148, a stylus 146, or a gesture or touch screen input device associated with the video display device 142 that allow a user to interact with the images, windows, and applications presented to the user. In an embodiment, the video display device 142 may provide output to a user that includes, for example, one or more windows or graphical user interfaces (GUIs) (e.g., interactive GUI 166) describing one or more instances of applications being executed by the hardware processor 102 of the information handling system. In this example embodiment, a window may be presented to the user that provides an interactive GUI representing the execution of that application, such as with guided gesture instructions or graphics.

The network interface device of the information handling system 100 shown as wireless interface adapter 128 can provide connectivity among devices such as with Bluetooth® (BT) or Bluetooth® Low Energy (BLE) which may be designated as BLE or in some cases referred generally to both or either as BT. The wireless interface adapter 128 also provides connectivity or to a network 134, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an access point 136 or base station 138 used to operatively couple the information handling system 100 to a network 134. In a specific embodiment, the network 134 may include macro-cellular connections via one or more base stations 138 or a wireless access point 136 (e.g., Wi-Fi or WiGig), or such as through licensed or unlicensed WWAN small cell base stations 138. Connectivity may be via wired or wireless connection. For example, wireless network access points 136 or base stations 138 may be operatively connected to the information handling system 100.

Wireless interface adapter 128 may include one or more radio frequency (RF) subsystems (e.g., radio 128) with transmitter/receiver circuitry, modem circuitry, one or more antenna front end circuits 132, one or more wireless controller circuits, amplifiers, antennas 134-1, 134-2 and other circuitry of the radio 130-1, 130-2 such as one or more antenna ports used for wireless communications via BT or multiple radio access technologies (RATs). The radio 130-1, 130-2 may communicate with one or more wireless technology protocols. In some embodiments, the radio 130-1 may contain individual subscriber identity module (SIM) profiles for each technology service provider and their available protocols for any operating subscriber-based radio access technologies such as cellular LTE communications.

In an example embodiment, the wireless interface adapter 128, radio 130-1, 130-2, and antenna 134-1, 134-2 may provide connectivity to one or more wireless PDs 156 that may include a wireless video display device 142, a wireless keyboard 144, a wireless mouse 150, a wireless headset, a microphone, a wireless stylus 146, and a wireless trackpad 148, among other wireless peripheral devices used as input/output (I/O) devices 140. For example, BT (including BLE), or WIFI protocols may be used among others. It is appreciated that the wireless PD 156 described herein may be any of the I/O devices 140 shown in FIG. 1. For case of explanation, the wireless PD 156 may be referred to herein as a wireless mouse that may be operatively and wirelessly coupled to the information handling system 100. However, the present specification contemplates that other types of wireless peripheral devices may be operatively coupled to the information handling system 100 via the methods and systems described herein. The wireless interface adapter 128 may include any number of antennas 134-1, 134-2 which may include any number of tunable antennas for use with the system and methods disclosed herein. In an embodiment, the information handling system 100 includes a Bluetooth® radio 130-2 operatively coupled to a second antenna 134-2 (e.g., a Bluetooth® antenna) used to operatively couple the wireless peripheral device 156 to the information handling system 100 under standard BT protocols or under the BLE protocol specifically as described in embodiments herein.

In some aspects of the present disclosure, the wireless interface adapter 128 may operate two or more wireless links. In an embodiment, the wireless interface adapter 128 may operate a Bluetooth® wireless link using a Bluetooth® wireless or Bluetooth® Low Energy (BLE). As described herein, the BLE wireless link may be used to communicate with and operatively couple a wireless peripheral device 156 to the information handling system 100 according to embodiments described herein. In an embodiment, the Bluetooth® wireless protocol or BLE may operate at frequencies between 2.402 to 2.48 GHZ. Other Bluetooth® or BLE operating frequencies may include 6 GHz are also contemplated in the presented description. In an embodiment, a Bluetooth® or BLE wireless link may be used to wirelessly couple the input/output devices operatively and wirelessly including the mouse 150, keyboard 144, stylus 146, trackpad 148, and/or video display device 142 to the bus 118 in order for these devices to operate wirelessly with the information handling system 100.

In an embodiment, the wireless interface adapter 128 may operate in accordance with any wireless data communication standards. To communicate with a wireless local area network, standards including IEEE 802.11 WLAN standards (e.g., IEEE 802.11ax-2021 (Wi-Fi 6E, 6 GHZ)), IEEE 802.15 WPAN standards, WWAN such as 3GPP or 3GPP2, Bluetooth® standards, or similar wireless standards may be used. Wireless interface adapter 128 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums.

The wireless interface adapter 128 can represent an add-in card, wireless network interface module that is integrated with a main board of the information handling system 100 or integrated with another wireless network interface capability, or any combination thereof. In an embodiment the wireless interface adapter 128 may include one or more radio frequency subsystems including transmitters and wireless controllers for connecting via a multitude of wireless links. In an example embodiment, an information handling system 100 may have an antenna system transmitter for Bluetooth®, BLE, 5G small cell WWAN, or Wi-Fi WLAN connectivity and one or more additional antenna system transmitters for macro-cellular communication. The RF subsystems and radios 130-1, 130-2 and include wireless controllers to manage authentication, connectivity, communications, power levels for transmission, buffering, error correction, baseband processing, and other functions of the wireless interface adapter 128.

During operation, the information handling system 100 may include a Bluetooth stack associated with the Bluetooth radio 130-2 for BT or BLE communications. In an embodiment, this Bluetooth stack may cause the Bluetooth radio 130-2 to monitor for broadcasted advertisements from one or more wireless peripheral devices 156. In an embodiment, the Bluetooth® pairing process includes Bluetooth® Low Energy (BLE) pairing processes that reduces power consumption by the wireless PD 156 and increases the potential pairing with increased diversity of information handling systems 100. Additionally, the BLE pairing systems and process allows for generic attribute profile (GATT) protocols being used that provides various security measures that allows for secure transmission of the pairing authorization passcode entry information 164 described herein. As described herein, wireless PDs 156 may include a wireless mouse, a wireless external monitor, a wireless keyboard, a wireless keypad, a wireless stylus, a wireless track pad, and the like. These wireless peripheral devices 156 may be used by the user to interface with the information handling system 100 after the wireless peripheral devices 156 have been operatively coupled, wirelessly, to the information handling system 100 according to the systems and methods described herein.

During monitoring for broadcasts from one or more wireless peripheral devices 156, the wireless interface adapter 128, via the BT radio 130-2 that may operate under the BLE protocol, may detect a broadcasted BLE advertisement from the wireless PD 156. In an embodiment, this broadcast signal may be detected as the wireless PD 156 is within a threshold distance from the information handling system 100. In an embodiment, this threshold distance may be between 20 cm to 40 cm. In an embodiment, this threshold distance is set at 30 cm. This threshold distance may be set so that only close proximity pairing between the information handling system 100 and the wireless PD 156 may be conducted. In an embodiment, the initial BLE broadcast from the wireless PD 156 may include received signal strength indicator (RSSI) data that defines a power level being received by the receiving radio such as the BT antenna 134-2 and BT radio 130-2 after the antenna and possible cable loss. Where the RSSI value is high, the wireless PD 156 is close to the information handling system and where the RSSI value is relatively lower, the wireless PD 156 is further away from the information handling system. In an example embodiment, the Bluetooth stack associated with the BT radio 130-2 may request this RSSI data signal from the wireless PD 156. In an embodiment, therefore, where a wireless peripheral device 186 is activated near multiple information handling systems 100, the RSSI threshold may prevent other information handling systems that are not within a threshold distance of the user's information handling system 100 shown in FIG. 1 for example.

In an embodiment, as the broadcasted BLE advertisement from the wireless PD 156 signals to the information handling system 100 to execute, via a hardware processor 102 for example, computer readable program code associated with a guided gesture authorization security exchange system 162. Further, in a parallel operation, the hardware processor 102 for example, may execute program code of a user interaction guided gesture instruction system 160. The execution of the guided gesture authorization security exchange system 162 causes the information handling system 100 to initiate a preliminary secure exchange communication with the wireless PD 156 under the BLE protocol in order to exchange input data, including gesture input data, from the wireless PD 156 to the information handling system 100 as described herein. In an embodiment, the information handling system 100, via execution of a Bluetooth® stack, initiate a generic attribute profile (GATT) connection of the BLE protocol with the wireless PD 156 to establish an encryption channel during the preliminary secure exchange communication. This encryption channel may be established using, for example, a variant elliptic-curve Diffie-Hellman (EDCH) share key generation protocol to generate a temporary public/private key and a pre-stored wireless PD 156 public key to generate a pre-shared key. The execution of the guided gesture authorization security exchange system 162 may further execute a hash function to generate a final encryption communication key. The hash function may be applied to the pre-shared key and, with a seed value, generate this final encryption communication key. In an embodiment, execution of the guided gesture authorization security exchange system 162 may further send the temporary pre-shared key and the final encryption communication key to the wireless PD 156 over this GATT communication channel for the establishment of the preliminary secure exchange communication. It is appreciated that other security measures may be used during this preliminary secure exchange communication so that third-parties cannot successfully execute a man-in-the-middle attack or other embodiments. These other security measures may include the use of counter with cipher block changing message authentication code counter with CBC-MAC (CCM mode) for cryptographic block ciphers as well as application of digital signatures to each communication between the information handling system 100 and the wireless PD 156 during this preliminary secure exchange communication including proof of each devices identities (e.g., the information handling system 100 and the wireless PD 156).

During operation, the computer readable program code of the user interaction guided gesture instruction system 160 may be initiated after the establishment of the preliminary secure exchange communication to generate an interactive graphical user interface (GUI) 166 and cause the interactive GUI 166 to be presented to a user to instruct and provide graphics for the user to provide guided gestures at the wireless PD 156 used to indicate confirmation that the pairing process is accepted by the user and provide a high level of authorization security under the BLE protocol via the preliminary secure exchange communication. In an embodiment, an initial GUI may be presented to a user to request whether the pairing process between the information handling system 100 and the wireless PD 156 is to be accepted (e.g., GUI provides an "accept" option) or aborted (e.g., GUI provides an "abort" option). Where the user selects the "abort" option, the process of pairing may end. Where the user selects the accept option, the pairing process may continue as described herein. In an embodiment, already connected input devices such as a keyboard 146, a mouse 152, a stylus 148, a trackpad 150, or a touchscreen may be used by the user to select the appropriate option based on whether the user wants to accept or abort the pairing process. In an embodiment, the wireless PD 156 could be used to accept the pairing process by providing, as input over the preliminary secure exchange communication, an indication that pairing is to proceed. For example, actuation of a button (e.g., left mouse click) may be presented over the preliminary secure exchange communication channel indicating to the guided gesture authorization security exchange system 162 that pairing is to proceed. This may be done to increase the usability of the unpaired wireless PD 156 in those situations where no other input device is present with the information handling system. This also allows for a full/acceptance/gesture authentication being completed by the wireless PD 156 to be operatively paired and connected to the information handling system 100.

When the user has accepted the pairing process to proceed, the user interaction guided gesture instruction system 160 may display, to the user on a video display device 144, an interactive GUI described herein. This interactive GUI 166 provides visual instructions to a user regarding how to interact with the wireless PD 156 to provide guided gestures for higher security pairing authorization. By providing instructions on the interactive GUI 166 to the user, guided gesture by the user interaction at the wireless PD 156 may be used to confirm the pairing acceptance of the user as well as capture gesture input data that is pairing authorization passcode entry information via the guided gesture interaction received at the wireless PD 156. It is this gesture input data at the wireless PD 156 that generates the pairing authorization passcode entry information used by the information handling system 100 to securely and wirelessly pair and then couple the wireless PD 156 to the information handling system 100 under the BLE protocols as described herein.

The user interaction guided gesture instruction system 160 may present any of a plurality of different example interactive GUIs 166 to the user. In an example embodiment where the user is attempting to wirelessly couple a wireless mouse, the GUI may present one or more interactive GUIs 166 that allow the user to interact with the displayed interactive GUI 166 using, for example, a right-click button, a left-click button, a scrolling wheel, movement detection sensor, as well as other input buttons to engage with the interactive GUI 166. Any of these modes of interaction at the right-click button, a left-click button, a scrolling wheel, movement detection sensor, or others may be used by the wireless PD 156 to generate gesture input data to be used for pairing authorization passcode entry information to pair and operatively coupling the wireless PD 156 wirelessly to the information handling system 100 under a BLE protocol. Although the present specification uses the example of a wireless mouse serving as the wireless PD 156 being paired and operatively and wirelessly coupled to the information handling system 100, the present specification contemplates that any wireless PD 156 may be paired and operatively and wirelessly coupled to the information handling system 100 under the BLE protocol using the systems and methods described herein. Therefore, the discussion of a wireless mouse as the wireless PD 156 is not meant to limit the present disclosure but instead serves as an example wireless PD 156 for ease of explanation throughout the present disclosure.

After the pairing authorization passcode entry information has been generated from gesture input data of one or more executed guided gesture actuations according to the example embodiments described herein, this pairing authorization passcode entry information is used to securely couple the wireless PD 156 to the information handling system 100 in a final pairing process. In and embodiment, this pairing authorization passcode entry information may be encrypted and transmitted to the information handling system 100 via the secure GATT communication channel created during the preliminary secure exchange communication and verified by the information handling system 100 as gesture input data that matches the anticipated gesture input data at the wireless PD 156 pursuant to the guided gesture instructions provided. This match indicates the received gesture input data is the pairing authorization passcode entry information necessary to confirm pairing of the wireless PD 156 with the information handling system 100.

In an embodiment, a form of the interactive GUI 166 may include a target marker and a moving matching marker for the user to provide a guided gesture or a sequence of guided gestures, via the wireless PD 156, when the target marker and matching marker are aligned during a time window within the interactive GUI 166. In an embodiment, the guided gesture interaction at the wireless PD 156 may include the actuation of a button or other input device at the wireless PD 156. Where the user sees, in one example embodiment, the moving matching marker aligned with the target marker during a time window, the timing of the actuation of the button or other input device at the wireless PD 156 (e.g., a wireless mouse) of the guided gesture may be determined by a microcontroller or other hardware processing device at the wireless PD 156. In an example embodiment, the information handling system 100 may send, via a Bluetooth® stack, a randomly generated time offset value to the wireless PD 156 for the time window of the guided gesture. This time offset value is used by both the wireless PD 156 and information handling system 100 to synchronize the timing of when the matching marker is to align with the target marker such that when the user actuates the button or other input device at the wireless PD 156 (e.g., within a given threshold timeframe) as the guided gesture interaction that is completed correctly with the alignment of the matching marker with the target marker in the time window.

It is appreciated that the guided gesture interaction operating the gesture input data at the wireless PD 156 by the user may be used by the microcontroller or other hardware processing device at the wireless PD 156 to send, wirelessly, log values that includes, at least, an elapsed time from the time offset value and the time the button or other input device of the wireless PD 156 is actuated by the user as well as the recorded guided gesture actuation values. In an embodiment, the gesture input data including the elapsed time value may be encrypted using a hash value such as authenticated encrypt/decrypt engine (AES) CCM-256 encryption algorithm for example. This encrypted value is sent to the information handling system 100 where the information handling system 100 decrypts, gesture input data including guided gesture actuation value and the elapsed time value and determines whether the guided gesture actuation value and elapsed time from the time offset matches when the matching marker was aligned with the target marker as presented to the user on the interactive GUI 166 in an embodiment. Where the information handling system 100 has indicated that the guided gesture actuation value and elapsed time value matches the anticipated guided gesture actuation value and the time when the matching marker had aligned with the target marker, the information handling system 100 may receive the pairing authorization passcode entry information as described herein. In one example embodiment, the pairing authorization passcode entry information may be generated using the elapsed time value or guided gesture actuation value or both as a seed value in a hash function (e.g., HMAC-SHA256 algorithm) to generate the pairing authorization passcode entry information from the gesture input data received and used to pair and wirelessly couple the wireless PD 156 to the information handling system 100 under the BLE protocol. In another embodiment, the elapsed time value or guided gesture actuation value or both may be encrypted as seed data in a hash function (e.g., HMAC-SHA256 algorithm) for transfer or exchange with the information handling system 100. In yet another example embodiment, the pairing authorization passcode entry information may be generated for a six digit value from the elapsed time value or guided gesture actuation value or both of the gesture input data received and used to pair and wirelessly couple the wireless PD 156 to the information handling system 100 under the BLE protocol. This pairing authorization passcode entry information (e.g., meeting the 6-digit passcode entry for Bluetooth® low energy pairing higher security level) is used to complete the wireless PD 156 pairing process.

The process of completing the pairing process may include the operation of the Bluetooth stack (not shown) associated with the BT radio 130-2 and BT antenna 134-2 to complete the Bluetooth® pairing of the wireless PD 156 to the information handling system 100. In an embodiment, the guided gesture authorization security exchange system 162 may direct the transmission or exchange of the pairing authorization passcode entry information from the gesture input data as well as other information at the BT radio 130-2 to establish pairing and a session key for a Bluetooth®/BLE connection between the wireless PD 156 and the information handling system 100 and, in some embodiments, may implement Bluetooth® low energy (BLE) protocols to accomplish this pairing process. Additionally, the wireless PD 156 may include a peripheral device pairing agent 158 that controls the initial broadcasting of the RSSI signal, the identification of the wireless PD 156, and other broadcasting packets, receiving guided gesture actuations, forming gesture input data, the encryption of gesture input data at the wireless PD 156, and transmission of that gesture input data to the information handling system 100. The execution of the computer readable program code associated with the peripheral device pairing agent 158 may be accomplished via a microcontroller or other type of hardware processing device at the wireless PD 156 as described herein.

In another embodiment, a form of the interactive GUI 166 may include a randomized sequence of numbers and a target marker placed at a location along the randomized sequence of numbers for the user to provide one or more guided gesture interactions at the wireless PD 156 to select the target marker as gesture input data. In this example embodiment, a scrolling wheel input device at a wireless mouse as the wireless PD 156 to be Bluetooth® paired with the information handling system 100 may be used to provide the one or more guided gesture interactions. The interactive GUI 166 presents to the user, at the video display device 144, the randomized sequence of numbers with the target marker presented randomly at one of the numbers. As the user scrolls up or down to cause a movable marker to match the location of the target marker this guided gesture actuation is recorded as is any relevant time of actuation. In an embodiment, the target marker and movable marker are different in color so that the user can better visually scroll the scrolling wheel on the wireless mouse to match the position of the movable marker to the location of the target marker. As the user provides this guided gesture interaction at the scrolling wheel, guided gesture interaction input is converted into gesture input data via operation of the microcontroller or other hardware processing device. This gesture input data may be provided by measuring the distance the user has rotated the scrolling wheel (either via incremental tactile stops while scrolling the scrolling wheel or an absolute rotational distance) in order to determine a scrolling input that reflects the number of movements from one randomized number to another in the randomized sequence of numbers so that the moveable marker matches the target marker. This may be reflected, for example, as UP_ID(03) indicating that, for example, the user rotated the scrolling wheel up a distance of three randomized numbers to cause the movable marker to match the target marker. Where the user has aligned the movable marker with the target marker, guided gesture instructions may be provided on the interactive GUI 166 instructing the user to click a button on the wireless mouse to confirm acceptance that the movable marker is aligned with the target marker as an additional guided gesture interaction. This gesture input data may be, in an embodiment, encrypted using an encryption algorithm such as AES-CCM-256 by the microcontroller or other hardware processing device of the wireless PD 156 and sent, wirelessly, to the information handling system 100 in an embodiment.

In another embodiment, when the user causes the movable marker to match the target marker and has provided the final wireless click as one or more guided gesture interactions, the interactive GUI 166 may be updated and reset to show a new randomized sequence of numbers with a new target marker for a second guided gesture in a received sequence of guided gestures. This updated randomized sequence of numbers and target marker location may allow the user to, again, provide a sequenced guided gesture interaction at the scrolling wheel to cause the movable marker to match another target marker in such an example embodiment. The introduction of the initial randomized sequence of numbers and subsequent and novel randomized sequence of numbers may be requested once or maybe repeated any number of times in order to provide multiple sequential sets of guided gesture interactions. For example, resulting gesture input data may include the original UP_(03) input, as well as other input such as DOWN_ID(02), and a final click represented as Click (0xFF) to the microcontroller or other hardware processing device. The wireless PD 156 (in this example embodiment, a wireless mouse) may keep track of the sequence of guided gesture interactions for further use as the final encrypted pairing authorization passcode entry information described herein.

After completing any number of input iterations at the wireless PD 156 (e.g., 1 or 4 iterations of guided gesture interactions based on presented interactive GUIs 166 to the user) the execution of the computer readable program code of the guided gesture authorization security exchange system 162 on the information handling system 100 may receive the gesture input data, in one embodiment as an AES-CCM-256-encrypted sequence, from the wireless PD 156. The information handling system 100 may then decode the encrypted sequence of the gesture input data provided by the user at the wireless PD 156 to receive the pairing authorization passcode entry information and determine if it matches.

As described herein, the pairing authorization passcode entry information, if it matches, is used to operatively pair the wireless PD 156 with the information handling system 100 under BLE protocol standards. In one embodiment, a declaration by the wireless PD 156 of its input and output capabilities may be fabricated to enable automatic passcode entry pairing with the wireless PD 156. This fabrication of the input and output capabilities of the wireless PD 156 may enable those wireless PDs 156 that do not have displays such as a wireless mouse, a wireless keyboard, a wireless headset, a wireless microphone, a wireless stylus, and a wireless trackpad, among other wireless peripheral devices. This allows automatic pairing where, for example, a 6-digit code associated with the pairing authorization passcode entry information does not have to be entered at the wireless PD 156 by the user.

In yet another embodiment, a form of the interactive GUI 166 may include randomized target marker direction placed at a location on the interactive GUI 166 for the user to provide one or more guided gesture interactions at the wireless PD 156 to select the randomized target marker direction. Similar to other embodiments described herein, a random icon may be presented to the user on the interactive GUI 166 with a correct guiding arrow highlighting, or description that indicates to the user how, for example, a scrolling wheel on a wireless mouse (acting as the wireless PD 156 in one example embodiment) is to be rotated. In another embodiment, a randomized target marker direction may elicit movement of the wireless PD 156 (e.g., moving mouse) in the direction as detected by a motion sensor as a guided gesture interaction. By matching the direction of the guiding arrow presented on the interactive GUI 166, the mouse may send the gesture input data (e.g., UP_(03) or DOWN_(02) or directional sensor data)) to the guided gesture authorization security exchange system 162 of the information handling system 100. In an embodiment, transmission may be conducted after encrypting that gesture input data (e.g., using AES-CCM-256 encryption algorithm). The guided gesture authorization security exchange system 162 may decrypt this data to retrieve the gesture input data in order to match it to the expected gesture input data based on the interactive GUI 166 presented to the user. The guided gesture actuations may be completed any number of times in sequence to develop, for example, a 20-bit key seed values stored in a four-group array with each of the groups one through four holding 5 bits in one embodiment. Each of the iterations of the guided gesture interactions presented at the wireless PD 156 (e.g., a wireless mouse in an example embodiment) as a result of a novel interactive GUI 166 being presented at the video display device 144 may represent such a group bit set. It is these encrypted 20-bit key seed values for each iteration that are sent as gesture input data to the wireless PD 156 via the GATT communication channel in one embodiment. Based on the user's gesture input data, the wireless PD 156 may be able to reconstruct the 20-bit key seed value with microcontroller or other hardware processing device of the wireless PD 156 extracting a 6 digit encrypted pairing authorization passcode entry information, for example, used to securely Bluetooth® pair the wireless PD 156 to the information handling system 100 in this example embodiment.

It is appreciated that other types of interactive GUIs 166 may be presented to the user in order to allow the user to provide guided gesture interactions for gesture input data from the wireless PD 156 in a preliminary secure exchange communication. In this manner, in-device gestures or inputs at the wireless PD 156 is used to communicate pairing authorization was well as visually transfer encrypted pairing authorization passcode entry information used for Bluetooth® BLE pairing of the wireless PD 156 to the information handling system 100. The systems and methods used herein may be used for those wireless PDs 156 that have input buttons, scrolling wheels, or other input devices, but that lack a video display device for manual input of, for example, a passcode. The systems and methods presented herein also provide for the prevention of man-in-the-middle attacks by providing a randomized interactive GUI 166 that only a user, operating the information handling system 100 in real-time, would be able to see and provide the appropriate guided gesture interactions at the wireless PD 156 to generate gesture input data used as pairing authorization passcode entry information and/or used for generation of the encrypted pairing authorization passcode entry information of the gesture input data.

In an embodiment, the information handling system 100 can include one or more sets of machine-readable code instructions, parameters, and profiles 112 that can be executed to cause the computer system to perform any one or more of the methods or computer-based functions disclosed herein. For example, machine-readable code instructions, parameters, and profiles 112 may execute, via hardware processing resources, various software applications, software agents, the BIOS 114 firmware and/or software, or other aspects or components. Machine-readable code instructions, parameters, and profiles 112 may execute, via the information handling system 100, the guided gesture authorization security exchange system 162 and the user interaction guided gesture instruction system 160 that are used for verification and pairing with the wireless PD 156 to the information handling system 100. Again, the machine-readable code instructions, parameters, and profiles 112 described herein may be stored on a non-volatile memory device and made accessible to the EC 104, the hardware processor 104, a microcontroller unit (MCU), or other hardware processing resource for execution. Various software modules comprising application instructions of machine-readable code instructions, parameters, and profiles 112 may be coordinated by an operating system (OS) 116, and/or via an application programming interface (API). An example OS 116 may include Windows®, Android®, and other OS types known in the art. Example APIs may include Win 32, Core Java API, or Android APIs.

In an embodiment, the disk drive unit 120 and may include machine-readable code instructions, parameters, and profiles 112 in which one or more sets of machine-readable code instructions, parameters, and profiles 112 such as software can be embedded to be executed by the processor 102 or other hardware processing devices such as a GPU 154 to perform the processes described herein. Similarly, main memory 106 and static memory 108 may also contain a computer-readable medium for storage of one or more sets of machine-readable code instructions, parameters, or profiles 112 described herein. The disk drive unit 120 or static memory 108 also contain space for data storage. Further, the machine-readable code instructions, parameters, and profiles 112 may embody one or more of the methods as described herein. In a particular embodiment, the machine-readable code instructions, parameters, and profiles 112 may reside completely, or at least partially, within the main memory 106, the static memory 108, and/or within the disk drive 120 during execution by the hardware processor 102, EC 104, or GPU 154 of information handling system 100. The main memory 106, GPU 154, EC 104, and the hardware processor 102 also may include computer-readable media.

Main memory 106 or other memory of the embodiments described herein may contain computer-readable medium (not shown), such as RAM in an example embodiment. An example of main memory 106 includes random access memory (RAM) such as static RAM (SRAM), dynamic RAM (DRAM), non-volatile RAM (NV-RAM), or the like, read only memory (ROM), another type of memory, or a combination thereof. Static memory 108 may contain computer-readable medium (not shown), such as NOR or NAND flash memory in some example embodiments. The applications and associated APIs, for example, may be stored in static memory 108 or on the disk drive unit 120 that may include access to a machine-readable code instructions, parameters, and profiles 112 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 and/or the backend management server 170 may further include a power management unit (PMU) 122 (a.k.a. a power supply unit (PSU)). The PMU 122 may include a hardware controller and executable machine-readable code instructions to manage the power provided to the components of the information handling system 100 such as the hardware processor 102, and other hardware components described herein. The PMU 122 may control power to one or more components including the one or more drive units 120, the hardware processor 102 (e.g., CPU), the EC 104, the GPU 154, a video/graphic display device 144 or other wired input/output devices 140 such as the stylus 148, a mouse 152, a keyboard 146, and a trackpad 150 and other components that may require power when a power button has been actuated by a user. In an embodiment, the PMU 122 may monitor power levels and be electrically coupled, either wired or wirelessly, to the information handling system 100 and/or the backend management server 170 to provide this power and coupled to bus 118 to provide or receive data or machine-readable code instructions. The PMU 122 may regulate power from a power source such as a battery 124 or AC power adapter 126. In an embodiment, the battery 124 may be charged via the AC power adapter 126 and provide power to the components of the information handling system 100, via a wired connections as applicable, or when AC power from the AC power adapter 126 is removed. PMU 122 may include a hardware controller to operate with the EC 104 separately or together to execute machine-readable code instructions, parameters, and profiles 112 of the guided gesture authorization security exchange system 162 and/or user interaction guided gesture instruction system 160 at the information handling system 100.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

When referred to as a "system," a "device." a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, ARM® brand processors, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
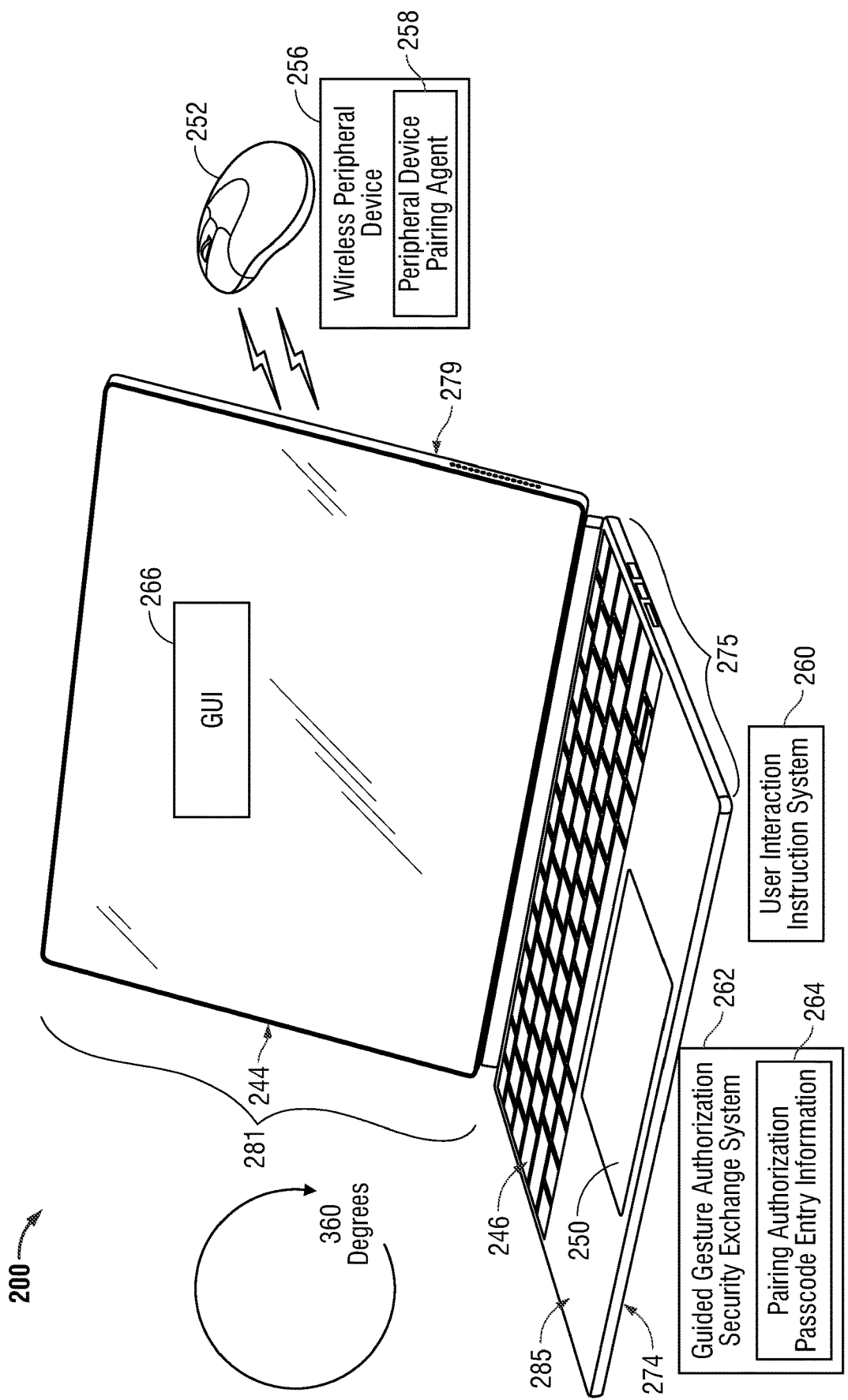
FIG. 2 is a graphic diagram of an information handling system pairable with a wireless peripheral device using a guided gesture authorization security exchange system according to an embodiment of the present disclosure.

FIG. 2 is a graphic diagram of an information handling system 200 pairable with a wireless peripheral device 256 using a guided gesture authorization security exchange system 262 according to an embodiment of the present disclosure. It is appreciated that any type of wireless PD 256 may be wirelessly coupled to the information handling system 200 and may include any wireless input/output device shown in FIG. 1 such as a wireless video display device (e.g., external video display device), a wireless stylus, a wireless trackpad, and other similar devices.

The information handling system 200 may, in an example embodiment, be a laptop-type information handling system 200. The information handling system 200 may, in an example embodiment, be a 360°-type information handling system 200. In the example shown in FIG. 2, the information handling system 200 may be a 360° information handling system 200 where an exterior surface of the bottom cover or bottom chassis 274 of a base chassis 275 may be brought towards an exterior side of the back display chassis 279 of the display chassis 281 to place the information handling system 200 in a tablet configuration in one embodiment. As shown in FIG. 2, the information handling system 200 may also be placed in a laptop configuration where the base chassis 275 is lying flat on a surface with the display chassis 281 being placed upright from the base chassis 275. Other configurations such as a dual tablet configuration and a tent orientation are contemplated as described herein.

The information handling system 200 may include a plurality of chassis made of metal, plastic, or the like. The information handling system 200, in an embodiment, may comprise an outer case or shell of an information handling system 200 for housing internal components of the information handling system 200, such as a video display device 244 (e.g., a built-in video display device 244), a cursor control device (e.g., built-in trackpad or touchpad 250), and an alpha numeric input device (e.g., built-in keyboard 291). As shown in FIG. 2, the information handling system 200 may include a built-in video display device 244 functioning to enclose the display chassis 281 with the back display chassis 279 described herein.

As another example, the information handling system 200 may further include the keyboard chassis 285 functioning to enclose a cursor control device such as a trackpad 250 and/or the built-in keyboard 291 acting as an alpha numeric input device. The back display chassis 279 and the video display device 244 may be joined together in an embodiment to form a fully enclosed display chassis 281, while the keyboard chassis 285 and a bottom chassis 274 may be joined together to form a fully enclosed base chassis 275. Taking a closed configuration as a reference position of the video display device 244 including the back display chassis 279 and the base chassis 275 including the keyboard chassis 285 and bottom chassis 274, the video display device 244 and back display chassis 279 may be rotated away from the base chassis 275 into the laptop configuration as shown in FIG. 2.

During operation, the information handling system 200 may include a Bluetooth stack associated with the Bluetooth radio (not shown). In an embodiment, this Bluetooth stack may cause the Bluetooth radio to monitor for broadcasted BLE advertisements from one or more wireless peripheral devices 256. In an embodiment, the Bluetooth® pairing process includes Bluetooth® Low Energy (BLE) pairing processes that reduces power consumption by the wireless PD 256 and increases the potential pairing with increased diversity of information handling systems 200. Additionally, the BLE pairing systems and process allows for generic attribute profile (GATT) protocols being used that provides various security measures that allows for secure transmission of the pairing authorization passcode entry information 264 (in an encrypted form in some embodiments) described herein. As described herein, wireless PDs 256 may include a wireless mouse, a wireless external monitor, a wireless keyboard, a wireless keypad, a wireless stylus, a wireless track pad, and the like. These wireless peripheral devices 256 may be used by the user to interface with the information handling system 200 after the wireless peripheral devices 256 have been operatively coupled, wirelessly, to the information handling system 200 according to the systems and methods described herein.

During monitoring for BLE broadcasts from one or more wireless peripheral devices 256, the wireless interface adapter (not shown), via the BT radio, may detect a BLE broadcasted advertisement from the wireless PD 256. In an embodiment, this broadcast signal may be detected as the wireless PD 256 is within a threshold distance from the information handling system 200. In an embodiment, this threshold distance may be between 20 cm to 40 cm. In an embodiment, this threshold distance is set at 30 cm. This threshold distance may be set so that only close proximity pairing between the information handling system 200 and the wireless PD 256 may be conducted. In an embodiment, the initial BLE broadcast from the wireless PD 256 may include received signal strength indicator (RSSI) data that defines a power level being received by the receiving radio such as the BT antenna and BT radio after the antenna and possible cable loss. Where the RSSI value is high, the wireless PD 256 is close to the information handling system and where the RSSI value is relatively lower, the wireless PD 256 is further away from the information handling system. In an example embodiment, the Bluetooth stack associated with the BT radio 230-2 may request this RSSI data signal from the wireless PD 256. In an embodiment, therefore, where a wireless peripheral device 286 is activated near multiple information handling systems 200, the RSSI threshold may prevent other information handling systems that are not within a threshold distance of the user's information handling system 200 shown in FIG. 2 for example.

In an embodiment, as the BLE broadcasted advertisement from the wireless PD 256 signals to the information handling system 200 to execute, via a hardware processor (not shown) for example, computer readable program code associated with a guided gesture authorization security exchange system 262. Further, in a parallel operation, the hardware processor 202 for example, may execute program code of a user interaction guided gesture instruction system 260. The execution of the guided gesture authorization security exchange system 262 causes the information handling system 200 to initiate a preliminary secure exchange communication under BLE with the wireless PD 256 in order to exchange gesture input data from the wireless PD 256 to the information handling system 200 as described herein. In an embodiment, the information handling system 200, via execution of a Bluetooth® stack, initiate a generic attribute profile (GATT) connection with the wireless PD 256 to establish an encryption channel during the preliminary secure exchange communication. This encryption channel may be established using, for example, a variant elliptic-curve Diffie-Hellman share key generation protocol to generate a temporary public/private key and a pre-stored wireless PD 256 public key to generate a pre-shared key in one embodiment. The execution of the guided gesture authorization security exchange system 262 may further execute a hash function to generate a final encryption communication key for a preliminary secure exchange communication link. The hash function may be applied to the pre-shared key and, with a seed value, generate this final encryption communication key for a preliminary secure exchange communication link. In an embodiment, execution of the guided gesture authorization security exchange system 262 may further send the temporary pre-shared key and the final encryption communication key to the wireless PD 256 over this GATT communication channel for the establishment of the preliminary secure exchange communication. It is appreciated that other security measures may be used during this preliminary secure exchange communication in other embodiments so that third-parties cannot successfully execute a man-in-the-middle attack. These other security measures may include the use of counter with cipher block changing message authentication code counter with CBC-MAC (CCM mode) for cryptographic block ciphers as well as application of digital signatures to each communication between the information handling system 200 and the wireless PD 256 during this preliminary secure exchange communication including proof of each devices identities (e.g., the information handling system 200 and the wireless PD 256) in other embodiments.

During operation the computer readable program code of the user interaction guided gesture instruction system 260 may be initiated after the establishment of the preliminary secure exchange communication to generate an interactive graphical user interface (GUI) 266 and cause the interactive GUI 266 to be presented to a user via video display device 244 for the user to provide guided gestures at the wireless PD 256 used to indicate confirmation that the pairing process is accepted and authorized at a higher security level by the user via the preliminary secure exchange communication. In an embodiment, an initial GUI may be presented to a user to request whether the pairing process between the information handling system 200 and the wireless PD 256 is to be accepted (e.g., GUI provides an "accept" option) or aborted (e.g., GUI provides an "abort" option). Where the user selects the "abort" option, the process of pairing may end. Where the user selects the accept option, the pairing process may continue as described herein. In an embodiment, already connected input devices such as a keyboard 246, a stylus (not shown), a trackpad 250, or a touchscreen may be used by the user to select the appropriate option based on whether the user wants to accept or abort the pairing process.

When the user has accepted the pairing process to proceed, the user interaction guided gesture instruction system 260 may display, to the user on a video display device 244, the interactive GUI described herein. This interactive GUI 266 provides visual instructions to a user regarding how to interact with the wireless PD 256 for one or more guided gestures. By providing instructions for one or more guided gestures on the interactive GUI 266 to the user, one or more guided gestures actuated by the user at the wireless PD 256 may be used to confirm the pairing acceptance of the user as well as capture gesture input data from use as pairing authorization passcode entry information. It is this gesture input data at the wireless PD 256 that is used as or generates the pairing authorization passcode entry information used by the information handling system 200 to securely pair and wirelessly couple the wireless PD 256 to the information handling system 200 under BLE protocols as described herein.

The user interaction guided gesture instruction system 260 may present a plurality of different interactive GUIs 266 to the user. In an example embodiment where the user is attempting to wirelessly couple a wireless mouse, the GUI may present one or more interactive GUIs 266 that allow the user to interact with the displayed interactive GUI 266 using, for example, guided gesture actuations with a right-click button, a left-click button, a scrolling wheel, device movement sensor, as well as other input buttons to engage with the interactive GUI 266. Any of these modes of guided gesture actuations with the right-click button, a left-click button, a scrolling wheel or movement may be used by the wireless PD 256 to generate gesture input data for use as pairing authorization passcode entry information to be used in pairing and operatively wirelessly coupling the wireless PD 256 to the information handling system 200 upon a match detected. Although the present specification uses the example of a wireless mouse as serving as the wireless PD 256 being operatively and wirelessly coupled to the information handling system 200, the present specification contemplates that any wireless PD 256 may be paired and wirelessly coupled to the information handling system 200 using the systems and methods described herein. Therefore, the discussion of a wireless mouse as the wireless PD 256 is not meant to limit the present disclosure but instead serves as an example wireless PD 256 for case of explanation throughout the present disclosure.

After the pairing authorization passcode entry information has been generated according to the example embodiments described herein, this pairing authorization passcode entry information is used to pair and securely couple the wireless PD 256 to the information handling system 200 in a final pairing process. In an embodiment, this pairing authorization passcode entry information or gesture input data may be encrypted and transmitted to the information handling system 200 via the secure GATT communication channel created during the preliminary secure exchange communication and verified by the information handling system 200 as gesture input data that matches the anticipated gesture input data from the wireless PD 256 necessary to confirm pairing of the wireless PD 256 with the information handling system 200.

In an embodiment, a form of the interactive GUI 266 with guided gesture instructions may include a target marker and a moving matching marker for the user to provide one or more guided gesture actuations, via the wireless PD 256, when the target marker and matching marker are aligned within the interactive GUI 266. In an embodiment, the input at the wireless PD 256 may include the guided gesture actuation of a button, scroll wheel, movement sensor, or other input device at the wireless PD 256. Where the user sees, in this example embodiment, the moving matching marker aligned with the target marker, the timing of the guided gesture actuation of the button, scroll wheel, movement sensor, or other input device at the wireless PD 256 (e.g., a wireless mouse) as presented in the guided gesture instructions may be determined by a microcontroller or other hardware processing device at the wireless PD 256. In an example embodiment, the information handling system 200 may send, via a Bluetooth® stack, a randomly generated time offset value to the wireless PD 256. This time offset value is used by both the wireless PD 256 and information handling system 200 to synchronize the timing of a time window when the matching marker is to align with the target marker such that when the user actuates the button or other input device at the wireless PD 256 (e.g., within a given time window) the guided gestures are completed correctly as to the alignment of the matching marker with the target marker.

It is appreciated that the gesture input data at the wireless PD 256 may be used by the microcontroller or other hardware processing device at the wireless PD 256 to send, wirelessly, log values that includes, at least, guided gesture actuation data and an elapsed time from the time offset value and the time the button or other input device of the wireless PD 256 is actuated by the user. In an embodiment, the guided gesture actuation data and elapsed time value may be encrypted using a hash value such as authenticated encrypt/decrypt engine (AES) CCM-256 encryption algorithm for example. This encrypted value is sent to the information handling system 200 where the information handling system 200 decrypts, at least, the guided gesture actuation data and elapsed time value and determines whether the guided gesture actuation data and elapsed time from the time offset matches when the matching marker was aligned with the target marker as presented to the user on the interactive GUI 266 and the guided gesture actuation instructed. Where the information handling system 200 has indicated that the elapsed time value matches the time when the matching marker had aligned with the target marker and the instructed guided gesture actuation, the information handling system 200 may generate the pairing authorization passcode entry information and the instructed guided gesture actuation as described herein. In an embodiment, the pairing authorization passcode entry information may be generated using the guided gesture actuation data and elapsed time value provided in the gesture input data if it matches. This gesture input data may be used as a seed value in a hash function (e.g., HMAC-SHA256 algorithm) to generate encrypted gesture input data that may serve as pairing authorization passcode entry information used to pair and wirelessly couple the wireless PD 256 to the information handling system 200. This pairing authorization passcode entry information (e.g., 6-digit passcode entry for Bluetooth® low energy pairing) may be generated at or sent, wirelessly, to the wireless PD 256 in various embodiments and the pairing process is completed under the BLE standard.

The process of completing the pairing process may include the operation of the Bluetooth stack (not shown) associated with the BT radio and BT antenna to complete the Bluetooth® BLE pairing of the wireless PD 256 to the information handling system 200. In an embodiment, the guided gesture authorization security exchange system 262 may direct the transmission or exchange of the encrypted pairing authorization passcode entry information from the gesture input data as well as other information at the BT radio to pair and then create a Bluetooth® BLE connection between the wireless PD 256 and the information handling system 200. In some embodiments herein, the Bluetooth® low energy (BLE) protocols to accomplish this pairing process. Additionally, the wireless PD 256 may include a peripheral device pairing agent 258 that controls the initial broadcasting of the RSSI signal, the identification of the wireless PD 256, and other broadcasting packets, the recording of guided gesture actuations as gesture input data, the encryption of gesture input data at the wireless PD 256 as applicable, and transmission of that gesture input data to the information handling system 200. The execution of the computer readable program code associated with the peripheral device pairing agent 258 may be accomplished via a microcontroller or other type of hardware processing device at the wireless PD 256 as described herein.

In another embodiment, a form of the interactive GUI 266 may include a randomized sequence of numbers and a target marker placed at a location along the randomized sequence of numbers to instruct the user to provide one or more guided gestures actuations at the wireless PD 256 to select the target marker to be recorded as gesture input data. In this example embodiment, a scrolling wheel input device at a wireless mouse that is the wireless PD 256 to be Bluetooth® paired with the information handling system 200 may be used to provide a guided gesture. The interactive GUI 266 presents to the user, at the video display device 244, the randomized sequence of number with the target marker presented randomly at one of the numbers and instructions are presented. As the user scrolls up or down to cause a movable marker to match the location of the target marker, then guided gesture is recorded by a microcontroller as all or a portion of gesture input data. In an embodiment, the target marker and movable marker are different in color so that the user can better visually scroll the scrolling wheel on the wireless mouse to match the position of the movable marker to the location of the target marker. As the user provides this guided gesture via actuation of the scrolling wheel, this is converted into gesture input data via operation of the microcontroller or other hardware processing device. This input data may be provided by measuring the distance the user has rotated the scrolling wheel (either via incremental tactile stops while scrolling the scrolling wheel or an absolute rotational distance) in order to determine a scrolling input that reflects the number of movements from one randomized number to another in the randomized sequence of numbers so that the moveable marker matches the target marker. This may be reflected, for example, as UP_ID(03) indicating that, for example, the user rotated the scrolling wheel up a distance of three randomized numbers to cause the movable marker to match the target marker. Where the user has aligned the movable marker with the target marker, instructions may be provided on the interactive GUI 266 instructing the user to click a button on the wireless mouse as another guided gesture to confirm acceptance that the movable marker is aligned with the target marker that is recorded as all or part of the gesture input data. Timing or sequence data for the guided gesture actuations may be recorded as gesture input data in some embodiments as well. This gesture input data may be, in one embodiment, encrypted using an encryption algorithm such as AES-CCM-256 by the microcontroller or other hardware processing device of the wireless PD 256 and sent, wirelessly, to the information handling system 200.

In some embodiments, a sequence of guided gestures are instructed to generate gesture input data. When the user causes the movable marker to match the target marker and has provided the final wireless click, the interactive GUI 266 may be updated and reset to show a new target marker and, in some embodiments, a new randomized sequence of numbers. This updated interactive GUI 266 the randomized target marker location or even the new sequence of numbers may allow the user to, again, provide a next guided gesture in a sequence by actuating the scrolling wheel to cause the movable marker to match the new target marker. The introduction of the initial randomized sequence of numbers and subsequent and novel randomized target markers, and even new sequences of numbers in some embodiments, may be repeated any number of times in order to provide multiple sequential sets of guided gestures to generate gesture input data. For example, this gesture input data may include the original UP_(03) input with a click (0xFF), as well as other input such as DOWN_ID(02), and a final click represented as Click (0xFF) to the microcontroller or other hardware processing device to record as gesture input data. The wireless PD 256 (in this example embodiment, a wireless mouse) may keep track of the sequence of guided gestures in the gesture input data. Then the gesture input data that may be transmitted to the information handling system 200 to be used as pairing authorization passcode entry information when matched with expected gesture input data at the information handling system 200 described herein.

After completing any number of guided gesture iterations at the wireless PD 256 (e.g., 4 iterations of input based on presented interactive GUIs 266 to the user) the execution of the computer readable program code of the guided gesture authorization security exchange system 262 on the information handling system 200 may send an AES-CCM-256-encrypted sequence to the wireless PD 256 on one embodiment. The wireless PD 256 may then decode the encrypted sequence of the gesture input data provided by the user at the wireless PD 256 to receive the pairing authorization passcode entry information if a match is determined.

As described herein, the pairing authorization passcode entry information is used to operatively pair the wireless PD 256 with the information handling system 200 under BLE protocols. In one additional embodiment, a declaration by the wireless PD 256 of its input and output capabilities may be fabricated to enable automatic passcode entry pairing with the wireless PD 256. This fabrication of the input and output capabilities of the wireless PD 256 may enable those wireless PDs 256 that do not have displays such as a wireless mouse, a wireless keyboard, a wireless headset, a wireless microphone, a wireless stylus, and a wireless trackpad, among other wireless peripheral devices. This allows automatic pairing where, for example, a 6-digit code associated with the pairing authorization passcode entry information does not have to be entered at the wireless PD 256 by the user.

In yet another embodiment, a form of the interactive GUI 266 may include randomized target marker direction placed at a location on the interactive GUI 266 with guided gesture instructions for the user to provide one or more guided gestures at the wireless PD 256 to select the randomized target marker direction. Similar to other embodiments described herein, a random icon may be presented to the user on the interactive GUI 266 with a correct guiding arrow, highlighting, or instruction that indicates to the user how, for example, a scrolling wheel or mouse movement detector on a wireless mouse (acting as the wireless PD 256 in this example embodiment) is to be rotated or moved. By matching the direction of the guiding arrow, highlighting, or instruction presented on the interactive GUI 266, the mouse may send the provided gesture input data (e.g., UP_(03) or DOWN_(02))) to the guided gesture authorization security exchange system 262 of the information handling system 200 for use as pairing authorization passcode entry information if it matches expected gesture input data of the guided gesture instructions. In one embodiment, transmission of the gesture input data may occur after encrypting that gesture input data (e.g., using AES-CCM-256 encryption algorithm). The guided gesture authorization security exchange system 262 may decrypt this gesture input data to retrieve the gesture input data in order to match it to the expected gesture input data based on the interactive GUI 266 guided gesture instructions presented to the user in such an embodiment. In some embodiments, the gesture input data may be used to generate a code, such as a 6 digit code, that is used as a pairing authorization passcode entry information.

In some embodiments, guided gesture instructions may be completed any number of times to develop a sequence of guided gestures to generate gesture input data. That gesture input data of a sequence of four guided gestures, for example in one embodiment, may be used as a 20-bit key seed values stored in a four-group array with each of the groups one through four holding 5 bits. Each of the iterations of the sequence of guided gestures presented at the wireless PD 256 (e.g., a wireless mouse in an example embodiment) as a result of the interactive GUI 266 and guided gesture instructions being presented at the video display device 244 may represent such a group bit set. It is these encrypted 20-bit key seed values for each sequential iteration that are sent to the wireless PD 256 via the GATT communication channel to form gesture input data. Based on the gesture input data, the wireless PD 256 may be able to reconstruct the 20-bit key seed value with microcontroller or other hardware processing device of the wireless PD 256 extracting a 6 digit encrypted pairing authorization passcode entry information, for example, that will then be used to securely Bluetooth® BLE pair the wireless PD 256 to the information handling system 200 upon confirmation of matching.

It is appreciated that other types of interactive GUIs 266 may be presented to the user in order to allow the user to provide one or more guided gestures for gesture input data from the wireless PD 256 in a preliminary secure exchange communication. In this manner, in-device gestures executed at the wireless PD 256 are used to determine and communicate pairing authorization with transfer or exchange of pairing authorization passcode entry information, in some embodiments encrypted, that is used for secure Bluetooth® BLE pairing of the wireless PD 256 to the information handling system 200. The systems and methods used herein may be used for those wireless PDs 256 that have input buttons, scrolling wheels, motion sensor, or other input devices to receive guided gesture actuation, but that lack a video display device for manual input of, for example, a passcode. The systems and methods presented herein also provide for the prevention of man-in-the-middle attacks by providing a randomized interactive GUI 266 that only a user, operating the information handling system 200 in real-time, would be able to see and provide the appropriate guided gesture actuations at the wireless PD 256 used for pairing confirmation and/or generation of the encrypted pairing authorization passcode entry information.

Figure 3:
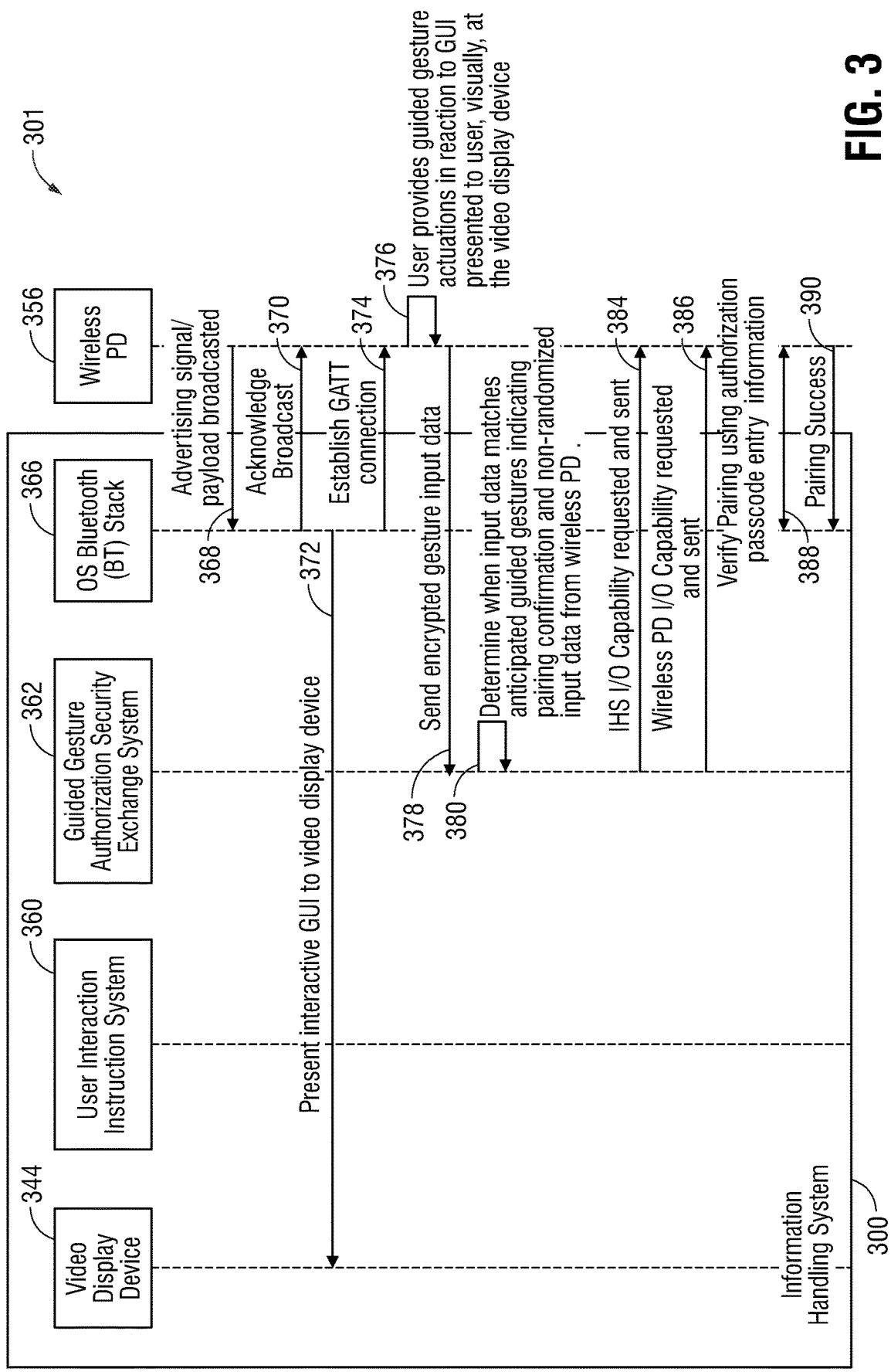
FIG. 3 is a process flow diagram of a method of querying, verifying, and Bluetooth® pairing a wireless peripheral device to an information handling system using the guided gesture authorization security exchange system according to an embodiment of the present disclosure.

FIG. 3 is a process flow diagram of a method 301 of querying, verifying, and Bluetooth® BLE pairing a wireless PD 356 to an information handling system 300 using the guided gesture authorization security exchange system according to an embodiment of the present disclosure. The method 301 includes a wireless PD 356 to be paired with the information handling system 300. Various components of the wireless PD 356 and the information handling system 300 are used to accomplish the pairing and wireless coupling of the wireless PD 156 to the information handling system 300. In an example embodiment, the information handling system 300 may include an operating system (OS) Bluetooth® (BT) stack 366 that, under the direction of the guided gesture authorization security exchange system 362, establish a secure communication channel between the wireless PD 356 and the information handling system 300 as well as securely transmit encrypted pairing authorization passcode entry information and other data between the information handling system 300 and the wireless PD 356. In an embodiment, the wireless PD 356 also includes a wireless BT radio to communicate with the OS BT stack 366.

The information handling system 100 also includes a user interaction guided gesture instruction system 360 that, under the direction of the guided gesture authorization security exchange system 362, causes one or more interactive GUIs to be displayed on the video display device 344 of the information handling system 300 with guide gesture instructions. As described herein, computer readable program code associated with the guided gesture authorization security exchange system 362 and the user interaction guided gesture instruction system 360 is executed by a hardware processing device (e.g., a GUI, a CPU, an embedded controller (EC), a GPU, among other hardware processing devices) to complete the steps and methods described herein.

As described herein, the wireless PD 356, at line 368, broadcasts a BLE advertisement to, among other devices, the information handling system 300. This BLE broadcast may include the advertising signal that indicates to the information handling system 300 that the initiation of the pairing process has been requested. The broadcasted signal at line 368 may also include a payload or other data that provides details about the wireless PD 356 to, for example, the information handling system 300. For example, the payload may include data that describes an RSSI value that prevents pairing with the wireless PD 356 where the RSSI value does not meet or exceed a threshold RSSI value. Other data may also include, for example, an identification and description of the wireless PD 156 such as a manufacturer as well as communication details such as which wireless protocol is to be used for communication between the wireless PD 356 and the information handling system 300 (e.g., BLE protocols). It is appreciated that other payload data may be provided in this initial broadcasting at line 368 and the present specification contemplates the broadcasting of this other data within the payload.

At line 370, the information handling system 300 may acknowledge the initial BLE broadcasting by the wireless PD 356. This acknowledgement may include data describing the information handling system 300 as a potential device to which the wireless PD 356 may be wirelessly paired with when the secure transmissions and confirming gesture input data for secure authorization according to embodiments herein has been provided between the information handling system 300 and the wireless PD 356.

At line 372, the OS BT stack 366 may inform the guided gesture authorization security exchange system 362 and user interaction guided gesture instruction system 360 that the BLE broadcast at line 368 was detected. Upon this notification, the guided gesture authorization security exchange system 362 and user interaction guided gesture instruction system 360 may conduct those processes as described herein. In an embodiment, the guided gesture authorization security exchange system 162 may direct the user interaction guided gesture instruction system 160 to present, at line 372, an initial GUI for acceptance and then the interactive GUI to the video display device 344.

In an embodiment, an initial GUI may be presented to a user to request whether the pairing process between the information handling system 300 and the wireless PD 356 is to be accepted (e.g., GUI provides an "accept" option) or aborted (e.g., GUI provides an "abort" option). Where the user selects the "abort" option, the process of pairing may end. Where the user selects the "accept" option, the pairing process may continue as described herein. In an embodiment, already connected input devices such as a keyboard, a mouse, a stylus, a trackpad, or a touchscreen may be used by the user to select the appropriate option based on whether the user wants to accept or abort the pairing process.

When the user has accepted the pairing process to proceed, the user interaction guided gesture instruction system 360 may display, to the user on a video display device 344, the interactive GUI described herein. This interactive GUI provides visual instructions to a user regarding how to interact with the wireless PD 356 for one or more guided gestures. By providing instructions on the interactive GUI to the user, execution of one or more guided gestures by the user at the wireless PD 356 may be used to confirm the pairing acceptance of the user as well as capture gesture input data for as use as pairing authorization passcode entry information from the guided gesture actuations received at the wireless PD 356. It is this gesture input data at the wireless PD 356 that is used as or to generate the pairing authorization passcode entry information used by the information handling system 300 to securely pair and wirelessly couple the wireless PD 356 to the information handling system 300 under the BLE protocols as described herein.

The user interaction guided gesture instruction system 360 may present a plurality of different interactive GUIs 366 to the user. As described herein, the interactive GUI may include a target marker and a moving matching marker for the user to provide one or more guided gesture actuations, via the wireless peripheral device 356, when the target marker and matching marker are aligned within the interactive GUI. In another embodiment, the interactive GUI may include a randomized sequence of numbers and a target marker placed at a location along the randomized sequence of numbers for the user to provide one or more guided gesture actuations at the wireless PD 356 to select the target marker. In yet another example embodiment, the interactive GUI may present or display a randomized target marker direction placed at a location on the interactive GUI for the user to provide one or more guided gesture actuations at the wireless PD 356 to select the randomized target marker direction. It is appreciated that other types of interactive GUIs may be presented to the user in order to allow the user to provide one or more guided gesture actuations and, thus, gesture input data from the wireless PD 356 in a preliminary secure exchange communication that is conducted before the wireless PD 356 is paired.

At line 374, the information handling system 100, using the OS BT stack 366, establishes a GATT communication channel with the wireless PD 356 in order to create a preliminary secure exchange communication as described herein. This preliminary secure exchange communication channel may allow for preliminary secure exchange communications between the information handling system 300 and the wireless PD 356 without the information handling system 300 and wireless PD 356 being paired with each other. In an embodiment the GATT communication under the BLE standard may be used to also provide proof of the identity of the wireless PD 356 and the information handling system 300 prior to the exchange of gesture input data from the wireless PD 356 to the information handling system 300 as described herein. The identity of the wireless PD 356 and information handling system 300 may be exchanged to provide, for example, a BT media access control (MAC) address or BT address associated with each of the network interface devices of the information handling system 300 and wireless PD 356. In an embodiment, during the creation of this GATT communication channel, the information handling system 300 may use the or a variant of ECDH key agreement protocols to generate a temporary public key and private key to generate a pre-shared key (e.g., pre-shared-key0). A hash function may also be used to further derive a final encryption common key (e.g., commonkey0). This hash function may include a hash algorithm applied to the pre-shared-key0 using some random seed value in order to derive the commonkey0.

In an embodiment, the guided gesture authorization security exchange system 362 controls the OS BT stack 366 to send the pre-shared-key0, the encrypted commonkey0, and an elliptic curve digital signature algorithm (ECDSA) digest to the wireless PD 356. In an embodiment, an AES-CCM256 encryption algorithm may be used to encrypt this data and send it over the GATT communication channel. In an embodiment, once it is received, the wireless PD 356 may decrypt the encrypted commonkey0 to derive the pre-shared-key0 and the commonkey0 using the agreed-upon ECDSA digest decryption algorithm. In doing so the microcontroller of the wireless PD 356 may decrypt the encrypted commonkey0 to derive an identity of the information handling system 300. In an embodiment, the wireless PD 356 may complete a similar encryption to transmit the proof of the wireless PD's 356 identity to be used for subsequent encryption activities as described herein.

As this preliminary secure exchange communication channel has been created between the wireless PD 356 and the information handling system 300, the user may begin to interact with the interactive GUI at line 376 as described herein. As the user interacts, visually, with the interactive GUI on the video display device 344, the user provides guided gesture actuation at the wireless PD 356 as indicated at line 376. In the context of a wireless mouse serving as the wireless PD 356 to be paired with the information handling system 300, this input may be accomplished by the user actuating a left-click button, a right-click button, rotating a scrolling wheel, activating a movement sensor, activating any other type of input button, or a combination thereof. Thus, as the user is seeing the interactive GUI and the instructions presented thereon directing the user to interact with the interactive GUI, this guided gesture actuation is provided at the wireless PD 356 to be paired with the information handling system 300. It is appreciated that the interactive GUI presents randomly generated instructions, target markers, moving markers, randomly generated numbers, and other generated icons such that the one or more guided gestures executed at the wireless PD 356 provided by the user is randomly completed. These guided gestures instructed via the interactive GUI may be random for security and they serve as both a pairing acceptance by the user as well as protection of the pairing process from a man-in-the-middle attack. This is because a man-in-the-middle attack would work only under those situations where an anticipated input anticipates that which is expected to be received from the wireless PD 356 by the guided gesture authorization security exchange system 362 on the information handling system 300. The execution of one or more guided gestures is collected as gesture input data via a microcontroller of the wireless PD 356 and pursuant to execution of code instructions for a peripheral device pairing agent.

This gesture input data (e.g., encrypted prior to transmission in an embodiment) is then sent to the guided gesture authorization security exchange system 362 at the information handling system 300. As described herein, the gesture input data acts as or generates the pairing authorization passcode entry information used to indicate BLE secure paring under, for example, security mode-1, level 4 usage. As this gesture input data is received at line 378 by the information handling system 300 the information handling system 300, at line 380, may decrypt the gesture input data and determine if the gesture input data (e.g., the gesture input data was based on the instructions given to the user from the interactive GUI) matches the anticipated guided instructions presented at the interactive GUI. Where there is no such match, a novel interactive GUI may again be presented that requires the user to again provide guided gesture actions at the wireless PD 356 in order to receive correct anticipated gesture input data from the user in an embodiment. In an alternative embodiment, where the gesture input data from the wireless PD 356 does not match the anticipated guided gestures instructed by and presented on the interactive GUI, the process may end with the pairing process not continuing.

Where the gesture input data from the wireless PD 356 does match the anticipated guided gestures presented on the interactive GUI at line 378, the method 301 may continue, at line 380, with the guided gesture authorization security exchange system 362 treating the gesture input data as the pairing authorization passcode entry information.

At line 384, the step of pairing the wireless PD 356 to the information handling system 300 may begin with requesting input and output (I/O) capabilities of the information handling system (IHS) 300 by the wireless PD 356 and transmitting those I/O capabilities to the wireless PD 356 from the information handling system 300. Similarly, at line 384, I/O capabilities of the wireless PD 356 may be requested by the information handling system 300 and transmitted to the information handling system 300 by the wireless PD 356 at line 386. This is done for establishing pairing to set up a BLE wireless link by the OS BT stack 366 and BT radios in the information handling system 300 and wireless PD 356.

As described herein, the exchange of I/O capabilities of the wireless PD 356 may be part of a special declaration use to enable automatic pairing authorization passcode entry information pairing with the information handling system 300. This special declaration may include the wireless PD 356 declaring that one of the I/O capabilities is a visual display although, in the example embodiment, of a wireless mouse, wireless stylus, wireless earbuds, wireless trackpad, wireless keyboard, or other similar wireless PD 356 do not include a video display device. Additionally, in an embodiment, the guided gesture authorization security exchange system 362 of the information handling system 300 may declare that the information handling system 300 includes a keyboard as in I/O device. This fabrication of the input and output capabilities of the wireless PD 356 may allow for automatic pairing where, for example, the input of a 6-digit code associated with the pairing authorization passcode entry information cannot be entered at the wireless PD 356 by the user due to the lack of such an input device (e.g., a keyboard) and/or an output device (e.g., a video display device).

When the I/O capabilities of the wireless PD 356 and information handling system 300 have been shared at lines 384 and 386, the information handling system 300 may use the generated pairing authorization passcode entry information confirmation to verify pairing with the wireless PD 356 at line 388. In an embodiment, BLE standard may be used to establish pairing so that a session key may be shared. The OS BT stack 366 and a BT radio allow the wireless PD 356 to communicate on a BT link with the information handling system 300. In an embodiment, pairing of the wireless PD 356 to the information handling system 300 is then completed at line 390. The pairing may operate according to the BLE standard to enable exchange of session keys to establish a paired BLE wireless connection between the wireless PD 356 and the information handling system 300 for communication of input/output data in an example embodiment. At this point, the method of FIG. 3 may end.

Figure 4:
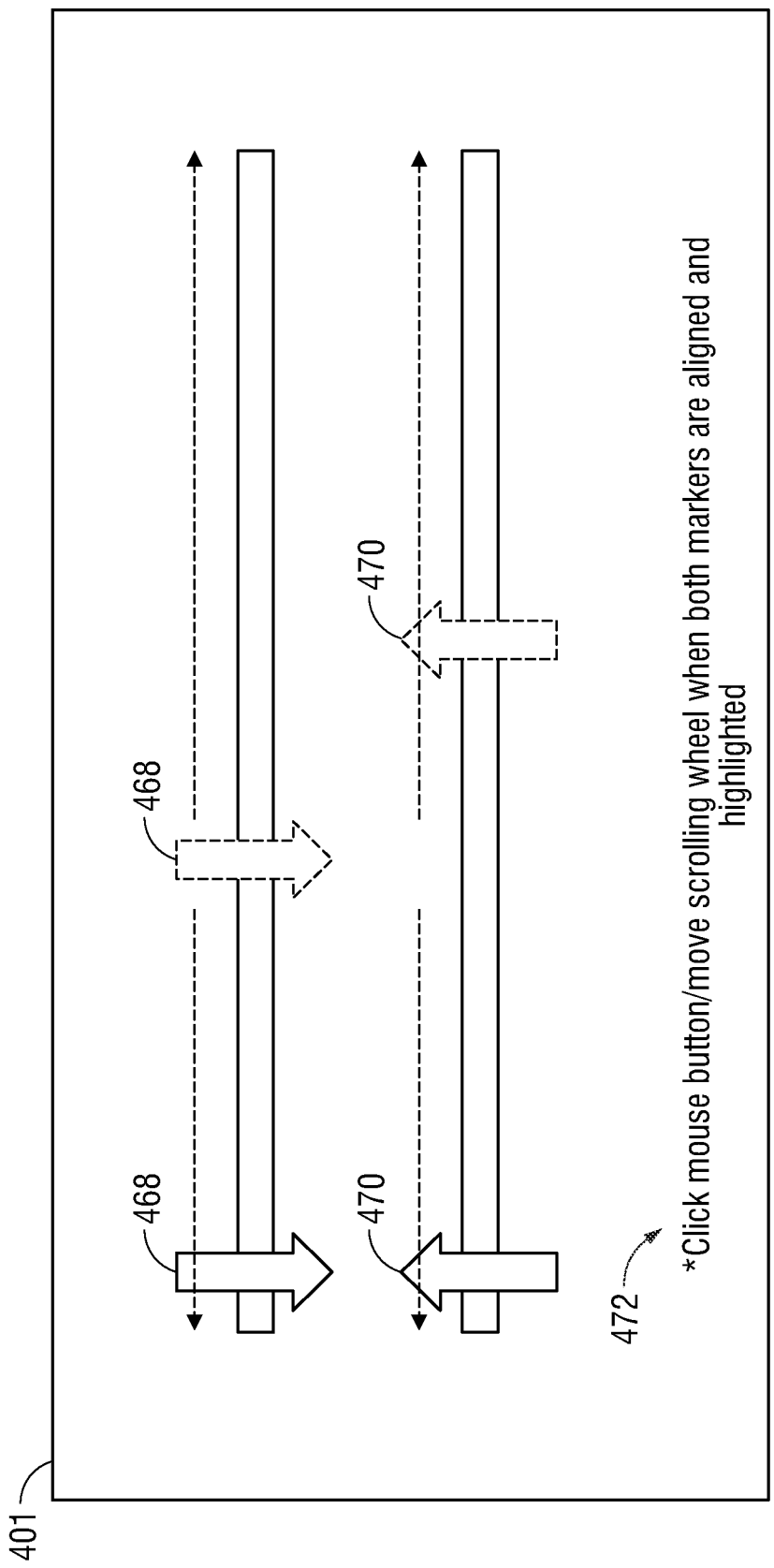
FIG. 4 is a graphic diagram of an interactive graphical user interface presented to a user on a video display device via operation of the guided gesture authorization security exchange system and user interaction guided gesture instruction system according to an embodiment of the present disclosure.

FIG. 4 is a graphic diagram of an interactive graphical user interface (GUI) 401 presented to a user on a video display device (e.g., 144, FIG. 1) via operation of the guided gesture authorization security exchange system and user interaction guided gesture instruction system according to an embodiment of the present disclosure. As described herein, the interactive GUI 401 shown in FIG. 4 may be one of many possible interactive GUIs 401 presented to a user after a pairable wireless PD that has broadcasted an BLE advertising signal and payload data package to the information handling system. In an embodiment, the interactive GUI 401 presented to the user may be a secondary interactive GUI 401 after a first initial GUI was presented to the user requesting a confirmation (e.g., "accept") or denial (e.g., "abort") of the pairing of the wireless PD to the information handling system. The interactive GUI 401 shown in FIG. 4, therefore, may serve to prevent man-in-the-middle attacks by requesting and instructing guided gesture interaction between the user actuating the wireless PD and the information handling system unique to that pairing process. Additionally, the gesture input data received from the wireless PD pursuant to the guided gesture or gestures may be used as seed data or other securable data repurposed as pairing authorization passcode entry information to be sent on the preliminary secure exchange communication and then used to complete the pairing process between the wireless PD and the information handling system.

The interactive GUI 401 shown in FIG. 4 includes, as an example, a target marker 468 and a moving matching marker 470. The target marker 468 may be visually aligned above the moving matching marker 470 and other visual aspects may be presented such as a sliding scale on which at least the moving matching marker 470 may move. It is appreciated that the target marker 468 shown in FIG. 4 is shown with dashed lines indicating a potential location of the target marker 468 along a line while a solid outlined target marker 468 is shown in a position along the line where the target marker 468 is vertically aligned with the moving matching marker 470. Similarly, the moving matching marker 470 shown in FIG. 4 is shown with dashed lines indicating a potential location of the moving matching marker 470 along a lined or sliding scale while a solid outlined moving matching marker 470 is shown in a position along the sliding scale where the moving matching marker 470 is vertically aligned with the target marker 468. Thus, in an embodiment, where the target marker 468 and moving matching marker 470 are aligned vertically, the appearance of these markers (468, 470) may change; in this example changing from being outlined in dashed lines to being outlined in solid lines or highlighted with a color.

In an embodiment, the target marker 468 may remain stationary along the line while the moving matching marker 470 moves along its sliding scale. The location of the target marker 468 may be randomized by execution of the computer readable program code of the user interaction guided gesture instruction system by a hardware processor such as a CPU, an EC, a GPU, or any other hardware processing device. At some point, the moving matching marker 470 may move directly below the target marker 468 such that the moving matching marker 470 is vertically aligned with the target marker 468. Again, when this vertical alignment is accomplished, the look of the target marker 468 and moving matching marker 470 may change; in this example embodiment, from a dashed outline to a solid outline. This may occur during a preset time window coordinated between the interactive GUI and the wireless peripheral device pairing agent by the guided gesture authorization security exchange system.

The interactive GUI 401 further includes a set of guided gesture instructions 472 that direct a user to provide a guided gesture, at the pairable wireless PD, as instructed. In the example embodiment shown in FIG. 4, the user is instructed to "Click mouse button/move scrolling wheel when both markers are aligned and highlighted." It is appreciated that the instructions 472 provided to the user on the interactive GUI 401 may change based on the interactive GUI 401 and the present specification contemplates the provision of other instructions per execution of the computer readable program code of the user interaction guided gesture instruction system by a hardware processing device.

As described herein, the executed guided gesture and its timing form gesture input data at the wireless PD from the user that is transmitted to the information handling system. This gesture input data is used by the guided gesture authorization security exchange system to confirm with the user interaction guided gesture instruction system that the gesture input data reflects or matches an anticipated gesture input and timing based on the interactive GUI 401 presented to the user. Where the input data matches the anticipated input data by the guided gesture authorization security exchange system, the gesture input data may be used as the pairing authorization passcode entry information to initiate secure BLE pairing as described herein.

Figure 5:
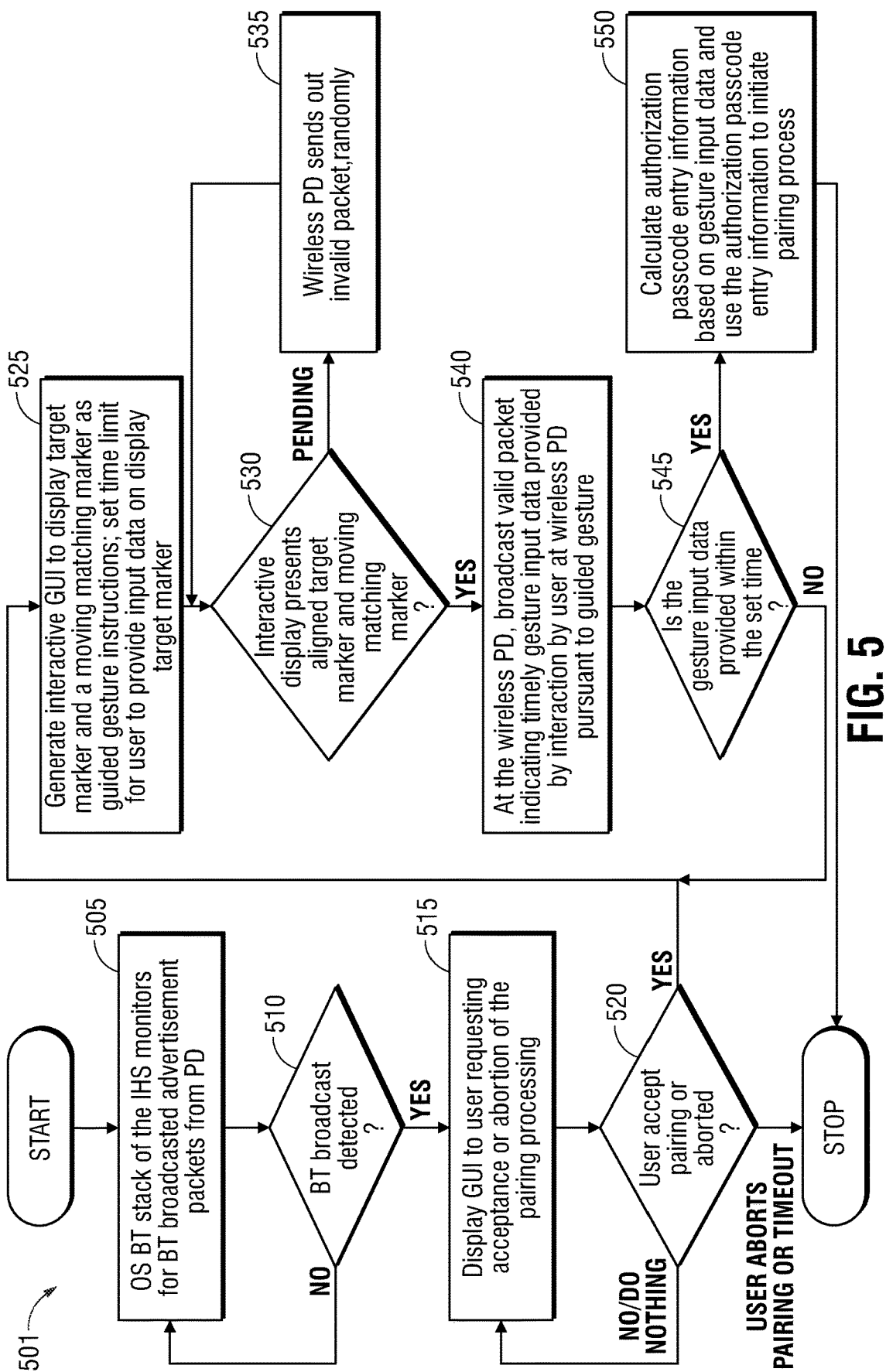
FIG. 5 is a process flow diagram of a method of querying, verifying, and Bluetooth® pairing a wireless peripheral device to an information handling system using the guided gesture authorization security exchange system according to another embodiment of the present disclosure.

FIG. 5 is a process flow diagram of a method 401 of querying, verifying, and Bluetooth® BLE pairing a wireless PD to an information handling system using the guided gesture authorization security exchange system according to another embodiment of the present disclosure. The method 501 may be used in connection with the interactive GUI presented in FIG. 4 in an example embodiment.

The method 501 may include, at block 505, the OS BT stack of the information handling system (IHS) may monitor for Bluetooth® BLE broadcasts advertising BLE pairing from potential wireless PDs near the information handling system. This monitoring may be a continuous monitoring in an example embodiment. In another embodiment, power considerations may be made such that the monitoring for BLE broadcasts from the wireless PD are detected intermittently with less power being used to continuously monitoring for these BLE broadcasts. However, it is appreciated that the frequency of these intermittent BLE monitoring episodes may be sufficient to detect those broadcasts from the wireless PD.

At block 510, the OS BT stack may determine whether a BLE broadcast is detected. Where a BLE broadcast is not detected at block 510, the method 501 returns to block 505 for continuation of the BLE broadcast monitoring. Where, at block 510, a BLE pairing request broadcast has been detected, the method 501 continues to block 515. At block 515, computer readable program code of the user interaction guided gesture instruction system is executed by a hardware processing device and, under the direction of the guided gesture authorization security exchange system, displays an initial GUI to a user on the video display device that requests the user to indicate whether to accept or reject the pairing process of the wireless PD to the information handling system. In an embodiment, the user may indicate whether to accept or reject this pairing process by using, for example, a keyboard, a touchscreen, or any other input device already operatively coupled to the information handling system. In an embodiment, where no input device is detected as being operatively coupled to the information handling system, the processes described in connection with blocks 515 and 520 may be skipped with the method 501 proceeding directly to block 525. In an embodiment, the wireless PD itself could be used to accept the pairing process by providing, as input over the preliminary secure exchange communication, an indication that pairing is to proceed. For example, actuation of a button (e.g., left mouse click) may be presented over the preliminary secure exchange communication channel indicating to the guided gesture authorization security exchange system 162 that pairing is to proceed.

In those embodiments where such an input device is operatively coupled to the information handling system, the user may select to "accept" the pairing process or "abort" the pairing process at 520. The determination at block 520 where the user aborts the pairing process or a timeout has been reached, the method 501 may end. Where the user does not provide input at block 520 the method 501 may return to block 515 with the time initial GUI being displayed.

At block 520, where it is determined that the user has selected the "accept" option to accept the pairing process, the method 501 continues to block 525. At block 525 the hardware processor may execute computer-readable program code of the user interaction guided gesture instruction system to generate an interactive GUI with guided gesture instructions and graphics. In an embodiment, this interactive GUI displays the target marker and the moving matching marker on the interactive GUI as described in connection with FIG. 4. Additionally, at block 525 a set time limit time window may be provided for the user to provide input data (e.g., timed when alignment occurs), at the wireless PD, according to the interactive GUI presented to the user on the video display device of the information handling system.

At block 530, method 501 includes determining whether the interactive display presents the aligned target marker and the moving matching marker. This may be determined by the user interaction guided gesture instruction system providing the guided gesture authorization security exchange system with an indication that the interactive GUI is currently displaying the target marker and the moving matching marker and when the target marker and moving matching marker have been aligned in a time window. Concurrently, at block 535, the wireless PD sends out invalid packets, randomly on either side of the time window in order to decrease man-in-the-middle attacks from retrieving the true gesture input data to be transmitted from the wireless PD to the information handling system as described herein. The transmission of random fake data packets from the wireless PD to the information handling system may be repeated any number of times on either side of the time window in order to confuse any entities acting as man-in-the-middle attackers with data packets that thwart such attacks.

Where it is determined that the interactive GUI 401 has shown the alignment of the target marker and the moving matching marker at block 530, the method 501 continues with the user executing a guided gesture within the time window and wireless PD generating gesture input data of the gesture actuation and timing. The wireless PD broadcasts the valid packets of the gesture input data indicating a timely guided gesture provided at the wireless PD indicating the interaction by the user with the alignment at the wireless PD at block 540. As described herein, this valid gesture input data may be generated at the wireless PD by the user actuating one or more guided gestures in a time window as the user had been instructed pursuant to the guided gesture instructions provided on the interactive GUI. The actuation data, timing, or any sequencing of the one or more guided gestures may be recorded as gesture input data by peripheral device pairing agent being executed by a microcontroller at the wireless PD.

At block 545, the guided gesture authorization security exchange system may be executed by a hardware processing device in order to determine if the gesture input data transmitted from the wireless PD was provided within the set time window and with an accurate guided gesture actuation. Where the gesture input data was not provided within the set time or the guided gesture actuation is not accurate, this may indicate that the user did not provide the guided gesture at the wireless PD at an appropriate time and pursuant to the instructions provided on the interactive GUI. It may indicate a false set of gesture input data that is unauthorized. Where the input data was not provided within the set time window or was not an accurate guided gesture actuation at block 545, the method may return to block 525 with generating another interactive GUI with randomly placed target marker and moving matching marker as described herein. Where, at block 545, the input gesture data was provided within the set time period and is an accurate guided gesture actuation, the guided gesture authorization security exchange system may determine the pairing authorization passcode entry information based on the gesture input data matching and use the pairing authorization passcode entry information to initiate a pairing process at block 550. Once the information handling system has been paired under the BLE protocols and session keys exchanged between the wireless PD and the information handling system, the method 501 may end.

It is appreciated that the transmission of data between the wireless PD and the information handling system may be conducted over a secure communication channel such as a GATT communication channel described herein. Additionally, it is appreciated that each of the wireless PD and information handling system include hardware processing devices that are used to encrypt and decrypt these communications to add more security to the data being transmitted.

Figure 6:
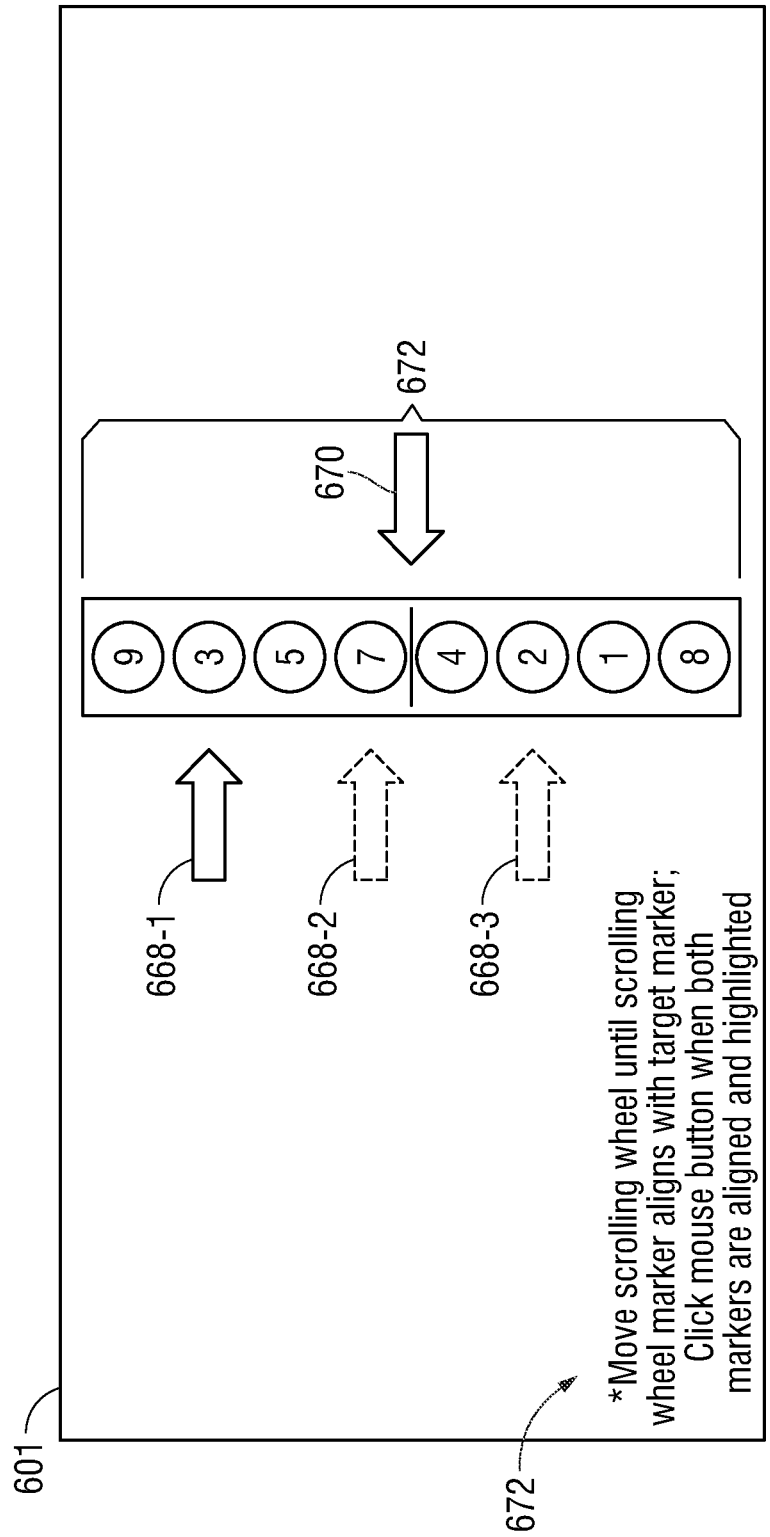
FIG. 6 is a graphic diagram of an interactive graphical user interface presented to a user on a video display device via operation of the guided gesture authorization security exchange system and user interaction guided gesture instruction system according to another embodiment of the present disclosure.

FIG. 6 is a graphic diagram of an interactive GUI presented to a user on a video display device via operation of the guided gesture authorization security exchange system and user interaction guided gesture instruction system according to another embodiment of the present disclosure. As described herein, the interactive GUI 601 shown in FIG. 6 may be one of many possible interactive GUIs 601 presented to a user after a pairable wireless PD has broadcasted an advertisement BLE pairing signal and payload data package to the information handling system. In an embodiment, the interactive GUI 601 presented to the user may be a secondary interactive GUI 601 after a first GUI was presented to the user requesting a confirmation (e.g., "accept") or denial (e.g., "abort") of the pairing of the wireless PD to the information handling system. The interactive GUI 601 shown in FIG. 6, therefore, may serve to prevent man-in-the-middle attacks by requesting randomized interaction in the form of one or more guided gestures between the user actuating the wireless PD and the information handling system unique to that pairing process. Additionally, the one or more guided gestures and their timing or sequence may be recorded as gesture input data. This gesture input data is received from the wireless PD during the preliminary secure exchange communication and may be used as seed data or repurposed as pairing authorization passcode entry information used to complete the pairing process between the wireless PD and the information handling system if a match is determined.

The interactive GUI 601 shown in FIG. 6 includes, as an example, a randomized sequence of numbers 672 arranged by the execution of the computer readable program code of the user interaction guided gesture instruction system by a hardware processing device (e.g., CPU. EC, GPU, or other hardware processing device). Additionally, the execution of the computer readable program code of the user interaction guided gesture instruction system by the hardware processor may highlight one of the numbers of the random sequence of numbers or aligns a target marker 668-1, 668-2, 668-3 with one of the randomized sequence of numbers 672 or between them along the numbers. In the example where the user is attempting to pair a wireless mouse, in one example embodiment, the guided gesture actuation at the wireless mouse may include the rotation of a scrolling wheel such that a moving marker 670 is moved up or down along the randomized sequence of numbers 672 to select the highlighted number. For example, the guided gesture actuation of the scrolling wheel may be moved to match the moving marker 670 with the one or more target marker 668-1, 668-2, 668-3. It is appreciated that this process may be completed any number of time for a sequence of plural guided gesture actuations with the execution of the computer readable program code of the user interaction guided gesture instruction system by a hardware device resetting the interactive GUI 601 to the same set of randomized sequence of numbers 672 with a new location of the target marker 668-1, 668-2, 668-3, or may include a new set of randomized sequence of numbers 672 as well in some embodiments. As such, FIG. 6 shows a total of three exemplary positions of the target marker 668-1, 668-2, 668-3 along the randomized sequence of numbers 672 with a first target marker 668-1 being shown in solid lines indicating a current target marker 668-1 and two additional target markers 668-2, 668-3 shown in dashed lines indicating potential other locations of the target marker 668-1, 668-2, 668-3 in subsequently-generated sequence of guided gesture instructions displayed on the interactive GUI 601.

In an embodiment, the movement of the scrolling wheel movement sensor or other input on the wireless mouse to be paired with the information handling system causes the moving marker 670 to move towards the highlighted number in the randomized sequence of numbers, such as to one of the target markers 668-1, 668-2, 668-3, until the highlighted number is selected or the markers are aligned with each other. To enhance the detection of the alignment of the moving marker 670 with the highlighted number or the target marker 668-1, 668-2, 668-3 for the user, each of the target marker 668-1, 668-2, 668-3 or highlighted number and moving marker 670 may be outlined with a different color. In an embodiment, where the moving marker 670 and the target marker 668-1, 668-2, 668-3 or highlighted number are in an aligned position, the color of the target marker 668-1, 668-2, 668-3 or highlighted number and the moving marker 670 may change to a matching color or be otherwise highlighted so that the user can more easily understand that alignment has been achieved for the instructed guided gesture. At this point, the user may, per the instructions 672 presented, click on a mouse button or other actuation to indicate the alignment of the moving marker 670 and the target marker 668-1, 668-2, 668-3 or highlighted number has been accomplished per another guided gesture. These guided gestures or a sequence of guided gestures, their timing or sequencing may be recorded by a microcontroller executing code of the peripheral device pairing agent at the wireless PD as gesture input data.

As described herein, the gesture input data at the wireless PD is transmitted, via a BT radio on the wireless PD over the preliminary secure exchange communication channel created between the information handling system and wireless PD (e.g., secure GATT channel). This gesture input data is used by the guided gesture authorization security exchange system to confirm, in real-time, with the user interaction guided gesture instruction system that the gesture input data reflects an anticipated gesture input based on the interactive GUI 601 presented to the user. Where the gesture input data matches the anticipated input data by the guided gesture authorization security exchange system, the input data may be used as or to develop the pairing authorization passcode entry information as described herein. With a match, the BLE pairing may be initiated under the BLE protocols.

Figure 7:
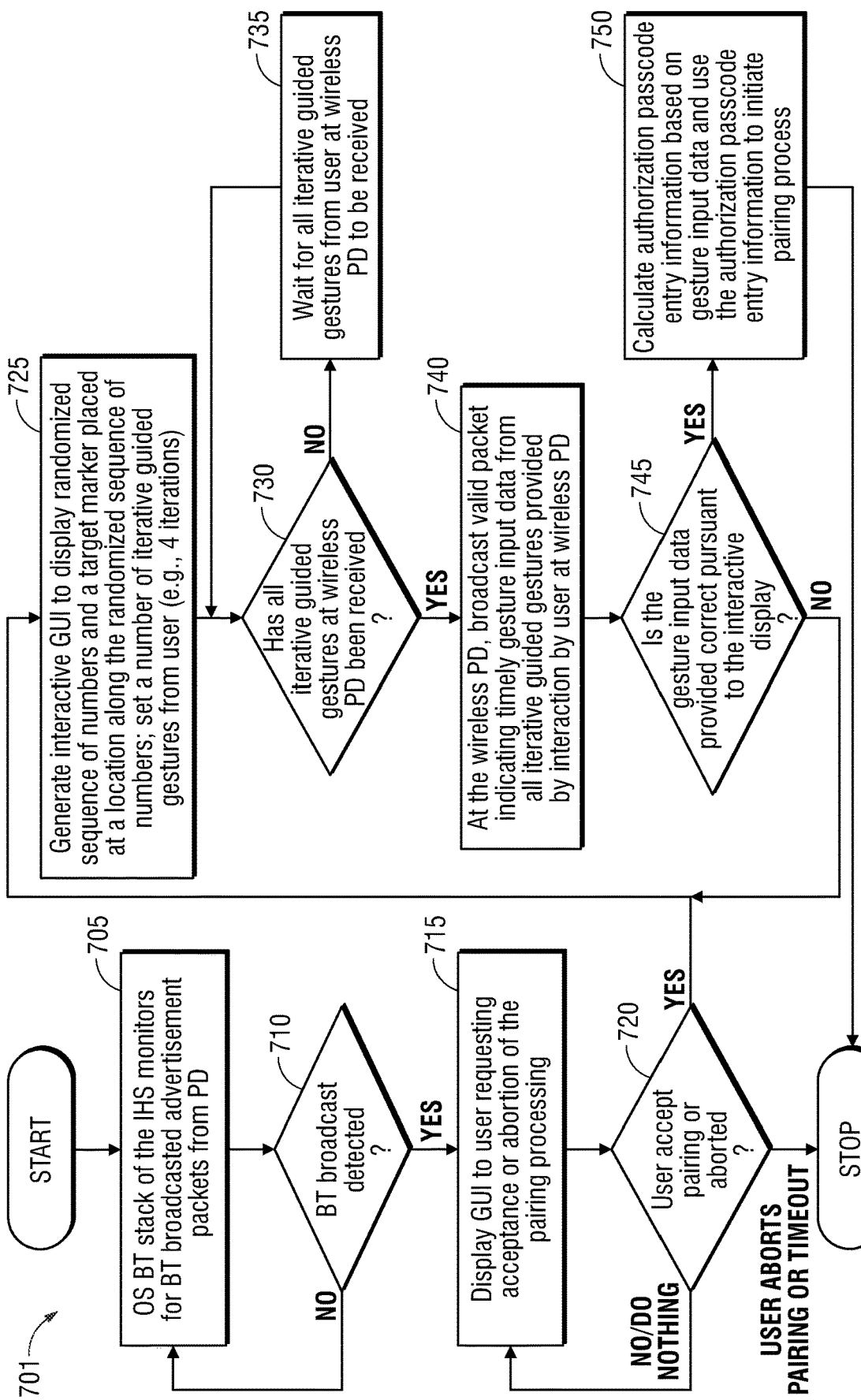
FIG. 7 is a process flow diagram of a method of querying, verifying, and Bluetooth® pairing a wireless peripheral device to an information handling system using the guided gesture authorization security exchange system according to another embodiment of the present disclosure.

FIG. 7 is a process flow diagram of a method 701 of querying, verifying, and Bluetooth® BLE pairing a wireless PD to an information handling system using the guided gesture authorization security exchange system according to another embodiment of the present disclosure. The method 701 may be used in connection with the interactive GUI presented in FIG. 6 in an example embodiment.

The method 701 may include, at block 705, the OS BT stack of the information handling system (IHS) may monitor for Bluetooth® (BLE pairing advertisement) broadcasts from potential wireless PDs near the information handling system. This monitoring may be a continuous monitoring in an example embodiment. In another embodiment, power considerations may be made such that the monitoring for BLE broadcasts from the wireless PD are detected intermittently with less power being used to continuously monitoring for these BLE broadcasts. However, it is appreciated that the frequency of these intermittent BLE monitoring may be sufficient to detect those broadcasts from the wireless PD.

At block 710, the OS BT stack may determine whether a BLE broadcast is detected. Where a BLE broadcast is not detected at block 710, the method 701 returns to block 705 for continuation of the BLE broadcast monitoring. Where, at block 710, a BLE pairing broadcast request has been detected, the method 701 continues to block 715. At block 715, computer readable program code of the user interaction guided gesture instruction system is executed by a hardware processing device and, under the direction of the guided gesture authorization security exchange system, displays an initial GUI to a user on the video display device that requests the user to indicate whether to accept or reject the pairing process of the wireless PD to the information handling system. In an embodiment, the user may indicate whether to accept or reject this pairing process by using, for example, a keyboard, a touchscreen, or any other input device already operatively coupled to the information handling system. In an embodiment, where no input device is detected as being operatively coupled to the information handling system, the processes described in connection with blocks 715 and 720 may be skipped with the method 701 proceeding directly to block 725. In an embodiment, the wireless PD itself could be used to accept the pairing process by providing, as input over the preliminary secure exchange communication, an indication that pairing is to proceed. For example, actuation of a button (e.g., left mouse click) may be presented over the preliminary secure exchange communication channel indicating to the guided gesture authorization security exchange system 162 that pairing is to proceed.

In those embodiments where such an input device is operatively coupled to the information handling system, the user may select to "accept" the pairing process or "abort" the pairing process at 720. This determination at block 720 where the user aborts the pairing process or the BLE pairing request times out, the method 701 may end. Where the user does not provide input at block 720 the method 701 may return to block 715 with the time initial GUI being displayed until selection or time out.

At block 720, where it is determined that the user has selected the "accept" option to accept the pairing process, the method 701 continues to block 725. At block 725 the hardware processor may execute computer-readable program code of the user interaction guided gesture instruction system to generate an interactive GUI. In an embodiment, this interactive GUI displays the randomized sequence of numbers and the target marker placed at a location along the sequence of numbers for the user to provide a guided gesture actuation at the wireless mouse by rotating the scrolling wheel, moving the mouse, or other actuation to select the target marker for alignment with a moving marker described in connection with FIG. 6. In an embodiment, the guided gesture actuation at the wireless mouse may be accomplished by the user by selecting or clicking with a button on the wireless PD to select the target marker for alignment with a moving marker described in connection with FIG. 6. These one or more guided gestures and their timing and sequence may be recorded by a microcontroller executing code of a peripheral device pairing agent at the wireless PD as gesture input data.

Additionally, at block 725 a set number of iterative sequential guided gestures from the user may be set such that a user may provide multiple sets of guided gestures at the wireless PD after being presented with the interactive GUIs for alignment or selection of target marker with movement of the moving marker at the display of the information handling system. In an embodiment, the number of iterative sequential guided gestures and, accordingly, the number of changes to the interactive GUI presented to the user is from one to four. It is appreciated, however, that in order to increase the security of the randomization of the sequential guided gestures from the wireless PD by the user and based on the interactive GUI presented, the number of iterations may be increased.

At block 730, computer readable program code of the peripheral device pairing agent is executed by a microcontroller at the wireless PD in order to determine if all iterative guided gestures at the wireless PD have been executed by the user including recording timing or sequence data for the guided gestures. Where not all iterative guided gestures have been received from the wireless PD, the method 701 includes, at block 735, waiting for all or any additional iterative guided gestures to be actuated by the user via the wireless PD. Where it is determined, at block 730, all iterative guided gestures have been received and form gesture input data the method 730 may proceed to block 740.

At block 740, the wireless PD transmits valid packets of gesture input data indicating timely guided gestures actuated from all the iterative guided gestures in sequence, if applicable, provided by interaction by the user at the wireless PD. In an embodiment, the wireless PD may also send out invalid packets, randomly on either side valid packets in order to decrease man-in-the-middle attacks from retrieving the gesture input data transmitted from the wireless PD to the information handling system during a known time window as described herein. The transmission of random fake data packets from the wireless PD to the information handling system may be repeated any number of times before or after valid packets in the time window in order to confuse any entities acting as man-in-the-middle attackers with data packets that thwart such attacks.

At block 745, the guided gesture authorization security exchange system may determine whether the gesture input data that was provided to the information handling system by the wireless PD is correct or matches anticipated gesture input data values pursuant to the interactive display and guided gesture instructions presented to the user. As described herein, the user interaction guided gesture instruction system, having presented the randomized sequence of numbers 672, a highlighted number in the randomized sequence of numbers or a target marker 668-1, 668-2, 668-3, and moving marker 670, may determine an anticipated set of gesture input data values to be received from the wireless PD. This anticipated set of gesture input data may be presented to the guided gesture authorization security exchange system for the guided gesture authorization security exchange system to compare that anticipated set of gesture input data to the gesture input data actually received from the wireless PD. This gesture input data serves as pairing authorization passcode entry information when it matches the anticipated guided gesture input data. Where, at block 745, the gesture input data received from the wireless PD does not match the anticipated set of input data, the method 701 will return to block 725 with another set of interactive GUIs being presented to the user for the user to attempt to provide correct guided gestures based on the new interactive GUIs presented.

Where, at block 745, the gesture input data received from the wireless PD matches the anticipated set of gesture input data as indicated by the user interaction guided gesture instruction system in the information handling system, the method 701 continues to block 750. At block 750, the guided gesture authorization security exchange system then determines that the pairing authorization passcode entry information is based on the gesture input data received from the wireless PD. Additionally, at block 750, the guided gesture authorization security exchange system uses the pairing authorization passcode entry information to initiate the BLE pairing process between the wireless PD and the information handling system under the BLE protocol as described herein.

Again, it is appreciated that the transmission of data between the wireless PD and the information handling system may be conducted over a secure communication channel such as a GATT communication channel described herein. Additionally, it is appreciated that each of the wireless PD and information handling system include hardware processing devices that are used to encrypt and decrypt these communications to add more security to the data being transmitted.

Figure 8:
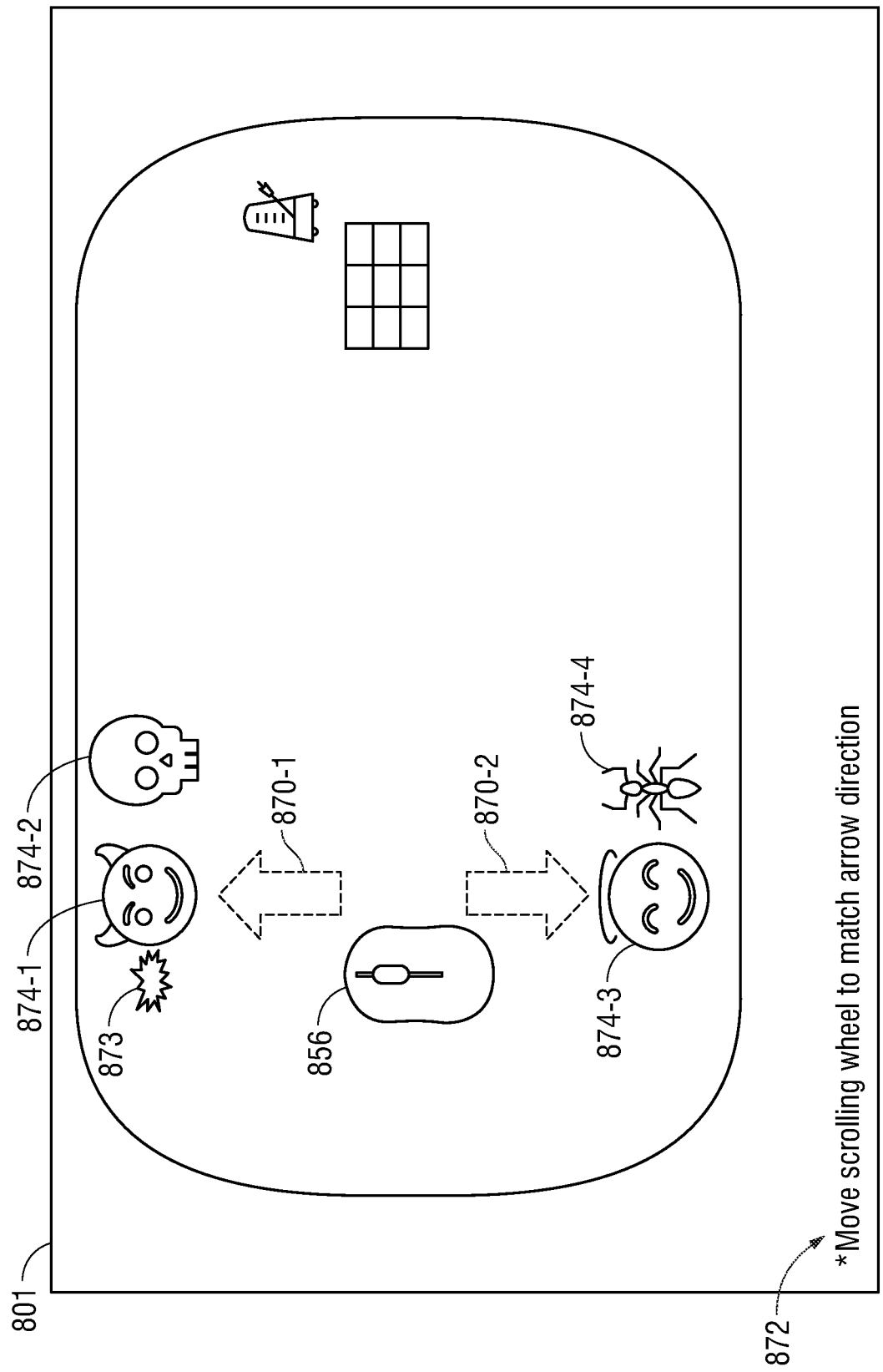
FIG. 8 is a graphic diagram of an interactive graphical user interface presented to a user on a video display device via operation of the guided gesture authorization security exchange system and user interaction guided gesture instruction system according to another embodiment of the present disclosure.

FIG. 8 is a graphic diagram of an interactive GUI presented to a user on a video display device via operation of the guided gesture authorization security exchange system and user interaction guided gesture instruction system according to another embodiment of the present disclosure. As described herein, the interactive GUI 801 shown in FIG. 8 may be one of many possible interactive GUIs 801 presented to a user after a pairable wireless PD 856 has broadcasted a BLE advertising signal and payload data package to the information handling system. In an embodiment, the interactive GUI 801 presented to the user may be a secondary interactive GUI 801 after a first GUI was presented to the user requesting a confirmation (e.g., "accept") or denial (e.g., "abort") of the pairing of the wireless PD 856 to the information handling system. The interactive GUI 801 shown in FIG. 6, therefore, may serve to prevent man-in-the-middle attacks by requesting randomized interaction between the user actuating the wireless PD 856 and the information handling system that is a guided gesture or a series of guided gestures unique to that pairing process authorization. Additionally, the guided gesture or gestures may comprise gesture input data recorded by a peripheral device pairing agent that is executed by a microcontroller at the wireless PD 856 during the preliminary secure exchange communication. This gesture input data may be used as a pairing authorization passcode entry information used to complete the pairing process between the wireless PD 856 and the information handling system when matched with expected gesture input data or a code generated therefrom and pursuant to the guided gesture instructions provided via the GUI 801.

The interactive GUI 801 shown in FIG. 8 includes, as an example, randomized target marker directions 870-1, 870-2 placed at locations on the interactive GUI 801 for the user to provide one or more guided gestures with the wireless peripheral device 856 by providing movements of wireless PD 856 to select one or more randomized target marker direction 870-1, 870-2 as indicated by an indicator 873 such as highlighting or instructions to move toward a described image 874-1 of the plurality of images presented 874-1, 874-2, 874-3, 874-4. In an embodiment, the interactive GUI 801 may display a plurality of randomized icons 874-1, 874-2, 874-3, 874-4. In another embodiment, a randomized target marker direction 870-1, 870-2 may appear on the interactive GUI 801 indicating, for example, which direction a user is to rotate a scrolling wheel or move the wireless PD 856 to actuate a motion sensor in order to select the appropriate randomized icon 872-1, 872-2 and provide a guided gesture actuation. In an embodiment, the randomized target marker direction 870-1, 870-2 may be indicated via a solidly outlined arrow. FIG. 8 shows the randomized target marker direction 870-1, 870-2 in dashed lines indicating example directions that may appear in the interactive GUI 801. In the example embodiment of the interactive GUI 801 in FIG. 8, the direction of the randomized target marker direction 870-1, 870-2 is either up or down corresponding to a user interacting with a scrolling wheel by either scrolling upwards or downwards, respectively. In another embodiment, movement of a wireless PD 856 or an input on a wireless PD 856 may be interacted with to correspond with an instructed, randomized direction 870-1, 970-2 for a user to execute a guided gesture or gestures. As described herein, the interactive GUI 801 shown may be one of a plurality of interactive GUIs 801 displayed to the user. In another embodiment, a timed sequence of plural, randomized target marker directions 870-1, 870-2 is shown a sequence of times iteratively in the GUI 801 presented to the user. In an embodiment, the timed sequence of gestures iterative randomized target marker directions 870-1, 870-2 presented by via the GUIs 801 is the timed sequence of guided gestures to be used as input data sent to the information handling system.

As the user scrolls using the scrolling wheel of a wireless mouse to be paired with the information handling system, for example, this guided gesture or gestures are recorded by a microcontroller or other hardware processing device executing a peripheral device pairing agent within the wireless mouse as gesture input data. The gesture input data from the user at the wireless mouse may be encoded by the microcontroller and transmitted to the information handling system using the preliminary secure exchange communication channel described herein. In an embodiment, the microcontroller may encrypt this gesture input data using, for example, the AES-CCM-256 encryption protocol. As the information handling system receives this gesture input data from the wireless mouse, the information handling system decrypts it. This received gesture input data may then be used as pairing authorization passcode entry information for determining a match and authorization to pair.

In one example embodiment, a 20-bit keyseed may be developed using the gesture input data received from the wireless mouse to form a code. For example, the keyseed development may include using each mouse gesture or input from the user as representing a group bit set with a mask pattern action called bitmasking. Bitmasking includes applying a mask over a value (e.g., "1" or "0") to keep, change, or modify a piece of given information. A mask determines which bits to take and which bits to clear off a binary number. In the example presented in FIG. 8, therefore, bits that make up input data defining a scrolling up of the scrolling wheel may be masked such that that input represents 5 bits at respective positions within the mask pattern. Similarly, bits that make down input data defining a scrolling down of the scrolling wheel may be masked such that that input represents 5 bits at respective inverse positions within the mask pattern. In such an example embodiment, the information handling system may send an encrypted mask pattern index to the wireless mouse via the GATT communication channel if and when a pattern type changes. The mask pattern selected may be dependent on how quickly or slowly the user performs the appropriate guided gesture or gestures at the scrolling wheel based on the interactive GUI 801 being displayed. This may enhance the security entropy where the pairing authorization passcode entry information that is finally generated is formed based on the user's timing of executing the guided gesture or guided gestures at the wireless mouse. The following setup for the keyseed may be as follows:

Keyseed Setup:
  Group 1 [5 bits]: For c=0 to 4, Group 1 [c]=Random_NonRepeat (0-19)
  Group 2 [5 bits]: For c=0 to 4, Group 2 [c]=Random_NonRepeat (0-19)
  Group 3 [5 bits]: For c=0 to 4, Group 1 [c]=Random (0-19)
  Group 4 [5 bits]: For c=0 to 4, Group 1 [c]=Random (0-19)
  $G1_3$, $G1_2$, $G3_3$, $G4_2$, $G2_1$, $G3_2$, $G4_1$, $G3_1$, $G2_3$, $G2_4$, $G1_4$, $G4_3$, $G3_4$, $G4_4$, $G1_3$, $G2_2$, $G3_4$, $G1_1$, $G4_4$ KeySeed-1 bit position versus group. $Gn_{idx}$; $G1_3$=>Group 1, index 3; n=Group Number; Idx=Array position.

The "Random_NonRepeat (1-19) is a random function which will not issue repeated data output to ensure all 20 numbers (e.g., 0 to 19) are assigned to groups Group 1 to Group 4 with each cell having a unique number representing the KeySeed-1 bit position. The numbers may represent the bit-position of the pairing authorization passcode entry information entry for KeySeed-1 with each group having five randomly assigned bits position. The bit mask pattern will be applied to the bits position of KeySeed-1 specified by the group.

In an embodiment where plural guided gestures are provided via a set iterative number of interactive GUIs 801 (e.g., 4), the information handling system and the wireless mouse (e.g., the wireless PD) will have completed setting the KEySeed-1 with 1 or 0 based on a groups bit assignment. An example may include a group execution sequence of 3, 4, 1, 2 where Group3 bits position=1, Group4 bits position=0, Group1 bits position=0, Group2 bits position=0. Therefore, based on the user executing a sequence of guided gestures at the wireless mouse, the wireless mouse will be able to reconstruct the KeySeed-1 value with reference to the group value setting according to the sequence of instructions 872 presented on the interactive GUI 801 to create the gesture input data for the sequential guided gestures. This gesture input data may then be the pairing authorization passcode entry information that is generated as follows:

pairing authorization passcode entry information=HMAC-SHA256 (key2, SHA256 (KeySeed-1||16Bytes-Adhoc-Constant-B)). Such pairing passcode entry information may be used to conduct BLE pairing between the wireless PD and the information handling system it is to be paired with upon the match being determined.

Figure 9:
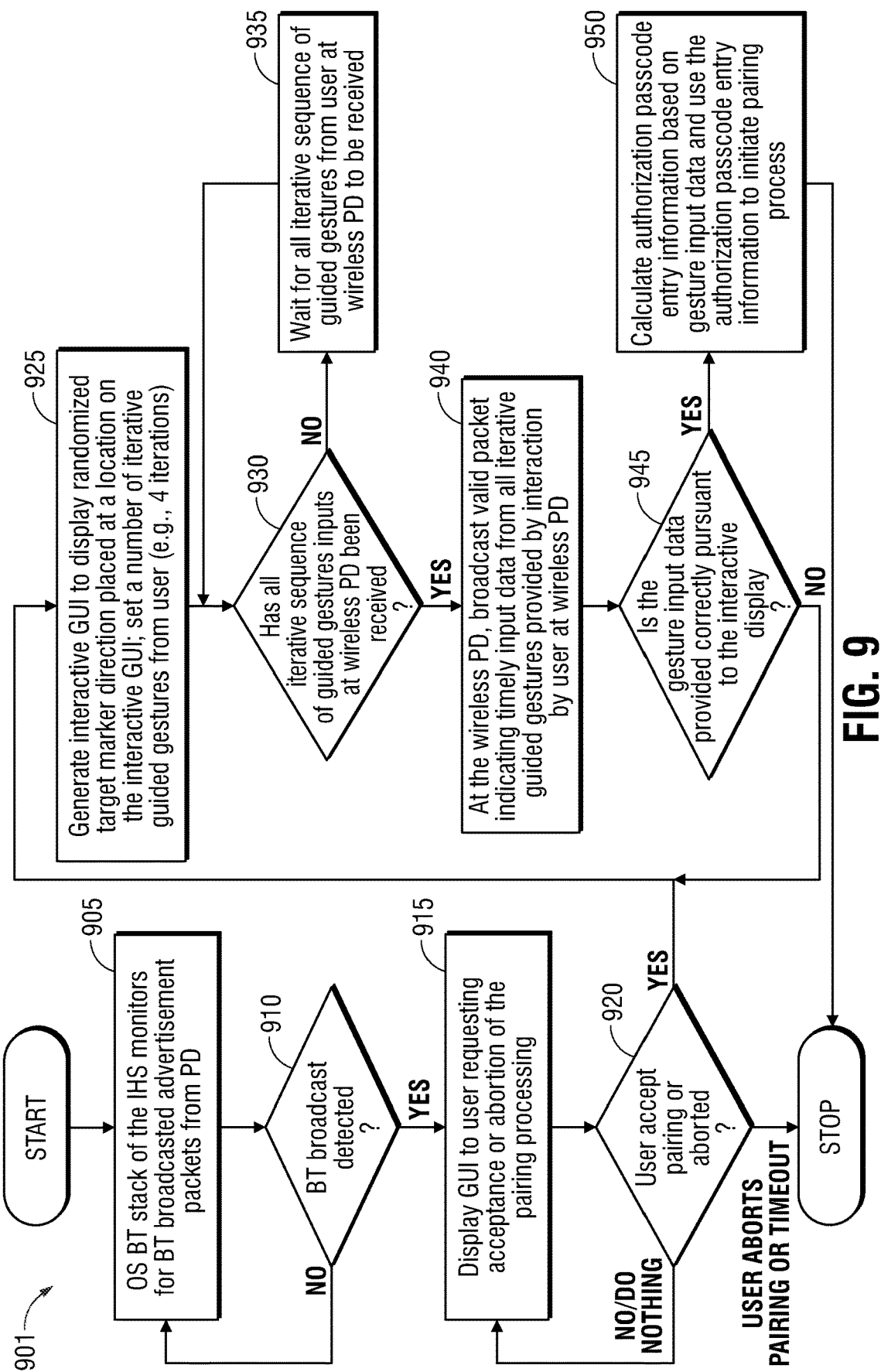
FIG. 9 is a process flow diagram of a method of querying, verifying, and Bluetooth® pairing a wireless peripheral device to an information handling system using the guided gesture authorization security exchange system according to another embodiment of the present disclosure.

FIG. 9 is a process flow diagram of a method 901 of querying, verifying, and Bluetooth® pairing a wireless peripheral device to an information handling system using the guided gesture authorization security exchange system according to another embodiment of the present disclosure. The method 901 may be used in connection with the interactive GUI presented in FIG. 8 for guided gesture instructions on the wireless PD to be paired in an example embodiment.

The method 901 may include, at block 905, the OS BT stack of the information handling system (IHS) may monitor for Bluetooth® BLE broadcasts from potential wireless PDs near the information handling system. This monitoring may be a continuous monitoring in an example embodiment. In another embodiment, power considerations may be made such that the monitoring for BLE broadcasts from the wireless PD are detected intermittently with less power being used to continuously monitoring for these BLE broadcasts. However, it is appreciated that the frequency of these intermittent BLE monitoring may be sufficient to detect those broadcasts from the wireless PD.

At block 910, the OS BT stack may determine whether a broadcast is detected. Where a BLE broadcast is not detected at block 910, the method 901 returns to block 905 for continuation of the BLE broadcast monitoring. Where, at block 910, a BLE pairing broadcast has been detected, the method 901 continues to block 915. At block 915, computer readable program code of the user interaction guided gesture instruction system is executed by a hardware processing device and, under the direction of the guided gesture authorization security exchange system, displays an initial GUI to a user on the video display device that requests the user to indicate whether to accept or reject the pairing process of the wireless PD to the information handling system. In an embodiment, the user may indicate whether to accept or reject this pairing process by using, for example, a keyboard, a touchscreen, or any other input device operatively coupled to the information handling system. In an embodiment, where no input device is detected as being operatively coupled to the information handling system, the processes described in connection with blocks 915 and 920 may be skipped with the method 901 proceeding directly to block 925. In an embodiment, the wireless PD itself could be used to accept the pairing process by providing, as input over the preliminary secure exchange communication, an indication that pairing is to proceed. For example, actuation of a button (e.g., left mouse click) may be presented over the preliminary secure exchange communication channel indicating to the guided gesture authorization security exchange system 162 that pairing is to proceed.

In those embodiments where such an input device is operatively coupled to the information handling system, the user may select to "accept" the pairing process or "abort" the pairing process at 920. In another aspect, if no response is received, a timeout condition may be reached and treated as an "abort." This determination at block 920 where the user aborts the pairing process, the method 901 may end. Where the user does not provide input at block 920 the method 901 may timeout and end after a period of time has expired.

At block 920, where it is determined that the user has selected the "accept" option to accept the pairing process or where any input device or display is detected at the information handling system, the method 901 continues to block 925. At block 925 the hardware processor may execute computer-readable program code of the user interaction guided gesture instruction system to generate an interactive GUI. In an embodiment, this interactive GUI displays one or more randomized target marker directions placed at locations that may be indicated by one or more randomized icons 871-1, 874-2, 874-3, 874-4 on the interactive GUI. A set a number of iterative guided gestures may need to be performed by the user (e.g., 1-4 iterations) to generate gesture input data. As described herein, the interactive GUI may display a plurality of randomized icons 871-1, 874-2, 874-3, 874-4 as direction destinations and used with guided gesture instructions. A randomized target marker direction indicator (e.g., 873) or a direction arrow (e.g., 870-1, 970-2) may be placed on the interactive GUI indicating, for example, which direction a user is to rotate a scrolling wheel or move the wireless PD to actuate the movement sensor in order to select the appropriate randomized icon (e.g., 874-1). In an example embodiment, the randomized target marker direction may be indicated via a solidly outlined arrow shown in the interactive GUI. In the example embodiment of the interactive GUI shown in FIG. 8, the direction of the randomized target marker direction is either up or down corresponding to a user interacting with a scrolling wheel by either scrolling upwards or downwards, respectively or moving the wireless PD. As described herein, the interactive GUI may display a plurality of sequenced randomized target marker directions as sequenced, guided gesture instructions to the user. The randomized target marker directions may be displayed in a timed iterative sequence on the interactive GUI presented to the user. In one example embodiment, the number of iterative, sequenced guided gestures may be four.

At block 930, code instructions of the peripheral device pairing agent executing on a microcontroller or other hardware processing resource on the wireless peripheral device may determine whether all iterative sequence of guided gestures at the wireless PD (e.g., wireless mouse) have been received or have timed out to form the gesture input data of recorded guided gesture actuations, timing, and sequencing for transmission to the guided gesture authorization security exchange system of the information handling system. Where not all iterative sequence of guided gestures have been received at the wireless PD, the method 901 includes, at block 935, waiting for all or any additional iterative guided gestures from the user via the wireless PD to be received at the information handling system. Where it is determined, at block 930, all iterative guided gestures have been received the method 930 may proceed to block 940.

At block 940, the wireless PD broadcasts valid packets indicating timely gesture input data from all iterative guided gestures provided by interaction by the user at the wireless PD to meet instructions from the GUI images and their sequence and timing. In an embodiment, the wireless PD may also send out invalid packets at off-times randomly in order to decrease man-in-the-middle attacks from retrieving the valid gesture input data transmitted from the wireless PD to the information handling system as described herein. The transmission of random fake data packets from the wireless PD to the information handling system may be repeated any number of times in order to confuse any entities acting as man-in-the-middle attackers with data packets that thwart such attacks.

At block 945, the guided gesture authorization security exchange system may determine whether the gesture input data that was provided to the information handling system by the wireless PD is correct pursuant to the interactive display presented to the user. As described herein, the user interaction instruction system, having presented the randomized icon 872-1, 872-2 and one or more randomized target marker directions 870-1, 870-2, may determine an anticipated set of gesture input data to be received from the wireless PD. This anticipated set of gesture input data may be presented to the guided gesture authorization security exchange system for the guided gesture authorization security exchange system to compare that anticipated set of gesture input data to the gesture input data actually received from the wireless PD. Where, at block 945, the gesture input data received from the wireless PD does not match the anticipated set of gesture input data, the method 901 will return to block 925 with another set of interactive GUIs being presented to the user for the user to attempt to provide correct gesture input data based on the new interactive GUIs presented.

Where, at block 945, the gesture input data received from the wireless PD matches the anticipated set of gesture input data as indicated by the user interaction instruction system, the method 901 continues to block 950. At block 950, the guided gesture authorization security exchange system then uses this gesture input data as or to determine pairing authorization passcode entry information based on the gesture input data received from the wireless PD as described in various embodiments herein. Additionally, at block 950, the guided gesture authorization security exchange system uses the pairing authorization passcode entry information when a match is determined to initiate the pairing process between the wireless PD and the information handling system under the BLE standards as described herein.

Again, it is appreciated that the transmission of gesture input data between the wireless PD and the information handling system may be conducted over a secure communication channel such as a GATT communication channel which is limited in functionality described herein and is formed prior to establishing a paired BLE communication channel. Additionally, it is appreciated that each of the wireless PD and information handling system include hardware processing devices that are used to encrypt and decrypt these communications to add more security to the data being transmitted in some embodiments.

The blocks and steps of the flow diagrams of FIGS. 3, 5, 7, and 9 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system comprising:
a hardware processor;
a memory device;
a power management unit (PMU) to provide power to the hardware processor and memory device;
the hardware processor executing computer readable program code of a guided gesture authorization security exchange system to communicate via a wireless interface adapter with a wireless peripheral device to initiate a preliminary secure exchange communication for a pairing process and to receive pairing authorization passcode entry information used to operatively Bluetooth Low Energy (BLE) pair and couple the wireless peripheral device with the information handling system;
the hardware processor executing computer readable program code of a user interaction guided gesture instruction system to generate an interactive graphical user interface (GUI) at a display device and cause the interactive GUI to be presented to a user for the user to provide, at the wireless peripheral device, a guided gesture on the wireless peripheral device recorded as gesture input data on the wireless peripheral devices;
the wireless interface adapter to receive the gesture input data from the wireless peripheral device that is used as the pairing authorization passcode entry information indicating that the pairing process is accepted by the user of the wireless peripheral device via the preliminary secure exchange communication if the gesture input data matches anticipated gesture input data at the guided gesture authorization security exchange system at the information handling system; and
the wireless interface adapter to pair and operably couple with the wireless peripheral device under the BLE protocol upon receipt of the pairing authorization passcode entry information that matches.

2. The information handling system of claim 1 further comprising:
the hardware processor executing computer readable program code of the user interaction guided gesture instruction system to generate the interactive GUI that presents a target marker and a moving matching marker for the user to provide the guided gesture as the gesture input data, via the wireless peripheral device, when the target marker and matching marker are aligned within the interactive GUI during a time window to provide the guided gesture timed with the alignment.

3. The information handling system of claim 1 wherein the guided gesture is a button press from the wireless peripheral device.

4. The information handling system of claim 1, wherein the hardware processor executes the computer readable program code of the guided gesture authorization security exchange system to provide an encrypted and randomly-generated time offset value for the time window to the wireless peripheral device indicating, to the wireless peripheral device, when, on the interactive GUI, the guided gesture is to be executed on the wireless peripheral device pursuant to a guided gesture instruction displayed on the interactive GUI.

5. The information handling system of claim 1 further comprising:
the hardware processor executing computer readable program code of the user interaction guided gesture instruction system to present with the interactive GUI a randomized sequence of numbers and a target marker placed at a location along the randomized sequence of numbers for the user to provide the guided gesture as the gesture input data at the wireless peripheral device by aligning a moving marker with the target marker along the randomized sequence of numbers.

6. The information handling system of claim 1, wherein the guided gesture is timed for actuation by the user at the wireless peripheral device to provide the gesture input data including a guided gesture actuation value and timing value from the wireless peripheral device to determine whether the gesture input data matches the anticipated gesture input data including anticipated guided gesture value and an anticipated timing value and thus serves as the pairing authorization passcode entry information if it matches.

7. The information handling system of claim 1 further comprising:
the hardware processor executing computer readable program code of the user interaction guided gesture instruction system to present with the interactive GUI a randomized target marker direction placed at a location on the interactive GUI for the user to provide the guided gesture actuation at the wireless peripheral device by providing actuation of a scroll wheel or movement sensor to move in the randomized target marker direction recorded to form the gesture input data.

8. The information handling system of claim 7, wherein plural randomized target marker directions are presented in a sequence of guided gesture instructions for the user to sequentially provide plural guided gestures to be timed and executed with the wireless peripheral device and recorded as the input gesture data that serves as the pairing authorization passcode entry information if it matches corresponding anticipated randomized target marker directions provided at the interactive GUI as the sequence of guided gesture instructions.

9. An information handling system comprising:
a hardware processor;
a memory device;
a power management unit (PMU) to provide power to the hardware processor and memory device;
the hardware processor executing computer readable program code of an guided gesture authorization security exchange system to communicate with a wireless mouse to initiate a preliminary secure exchange communication for a pairing process, via a wireless interface adapter, and to receive pairing authorization passcode entry information used to pair and operatively couple the wireless mouse with the information handling system, wherein the wireless mouse includes an input button and a scrolling wheel;

the hardware processor executing computer readable program code of a user interaction guided gesture instruction system to generate an interactive graphical user interface (GUI) at a display device and cause the interactive GUI to be presented to a user with guided gesture instructions instructing the user to provide a guided gesture on the wireless mouse used to provide a guided gesture actuation that is recorded as gesture input data at the wireless mouse;

the wireless interface adapter to receive the gesture input data from the wireless mouse and that is used as the pairing authorization passcode entry information that the pairing process is accepted by the user of the wireless mouse via the preliminary secure exchange communication when the gesture input data matches anticipated gesture input data at the guided gesture authorization security exchange system on the information handling system determined pursuant to the guided gesture instructions; and the wireless interface adapter to pair and operably couple with the wireless mouse upon receipt of the pairing authorization passcode entry information.

10. The information handling system of claim 9, wherein the hardware processor executing computer readable program code of the user interaction guided gesture instruction system to present with the interactive GUI a randomized sequence of numbers and a highlighted number at a location along one of the randomized sequence of numbers for the user to provide the guided gesture movement of a moving marker to the highlighted number with a guided gesture actuation at the wireless mouse that is recorded as the gesture input data.

11. The information handling system of the claim 9 further comprising:

the hardware processor executing computer readable program code of the user interaction guided gesture instruction system to present with the interactive GUI a randomized sequence of numbers and a target marker placed at a location along the randomized sequence of numbers for the user to provide the guided gesture at the wireless mouse by rotating the scrolling wheel to select the target marker location along the randomized sequence of numbers.

12. The information handling system of claim 9, wherein actuation of the guided gesture at the wireless mouse provides gesture input data from the wireless mouse and the gesture input data is encrypted to be received at the information handling system and decrypted to determine whether the gesture input data matches and serves as the pairing authority passcode entry information for authorization of pairing the wireless peripheral device with the information handling system.

13. The information handling system of claim 9 further comprising:

the hardware processor executing computer readable program code of the user interaction guided gesture instruction system to present with the interactive GUI a target marker and a moving matching marker for the user to provide the guided gesture, timed, via actuation of the input button on the wireless mouse, when the target marker and matching marker are aligned within the interactive GUI.

14. The information handling system of claim 13, wherein the hardware processor executes the computer readable program code of the guided gesture authorization security exchange system to provide an encrypted and randomly-generated time offset value for a timing window to the wireless mouse indicating, to the wireless mouse, when a timing window will occur for when, on the interactive GUI, the target marker is aligned with the moving matching marker and the guided gesture is to be executed on the wireless mouse pursuant to the guided gesture instruction displayed on the interactive GUI.

15. The information handling system of claim 9 further comprising:

the hardware processor executing computer readable program code of the user interaction guided gesture instruction system to present with the interactive GUI a randomized target marker direction placed at a location on the interactive GUI for the user to provide the guided gesture at the wireless mouse by moving the wireless mouse in a direction of the randomized target marker direction that is recorded as the gesture input data to be received at the information handling system and compared to the anticipated gesture input data determined from the guided gesture instructions displaying the randomized target marker direction for a match.

16. The information handling system of claim 15, wherein a plurality of randomized target marker directions are presented in a sequence of guided gesture instructions for the user to actuate plural guided gestures in the sequence with the wireless mouse to provide gesture input data that sent to the information handling system to determine whether the gesture input data serves as the pairing authorization passcode entry information when it matches corresponding anticipated gesture input data for the sequence of randomized target marker directions displayed as the guided gesture instructions at the interactive GUI.

17. An information handling system comprising:
a hardware processor;
a memory device;
a power management unit (PMU) to provide power to the hardware processor and memory device;
the hardware processor executing computer readable program code of a guided gesture authorization security exchange system to communicate, via a wireless interface adapter, with a wireless peripheral device to initiate a preliminary secure exchange communication for a pairing process and to receive gesture input data as pairing authorization used to pair and operatively couple the wireless peripheral device with the information handling system over a generic attribute profile (GATT) communication channel of the Bluetooth @ Low Energy (BLE) protocol;
the hardware processor executing computer readable program code of a user interaction guided gesture instruction system to generate an interactive graphical user interface (GUI) and cause the interactive GUI to present guided gesture instructions and graphics to a user for the user to provide guided gesture actuations recorded as gesture input data at the wireless peripheral device and transmitted to the information handling system via the preliminary secure exchange communication;
the hardware processor executing computer readable program code of the guided gesture authorization security exchange system to receive gesture input data, via the wireless interface adapter, from the wireless peripheral device indicative of a user actuating the wireless peripheral device to provide the instructed guided gesture actuations as an acceptance and determine if it matches anticipated gesture input data determined from the guided gesture instructions displayed by the user interaction guided gesture instruction system; and a wireless interface adapter to pair and operably couple with the wireless peripheral device under the BLE protocol upon receipt upon determining that the received gesture input data and the anticipated gesture input data determined from the guided gesture instructions match.

18. The information handling system of claim 17 further comprising:

the hardware processor executing computer readable program code of the user interaction guided gesture instruction system to present to a user with the interactive GUI a randomized target marker direction placed at a location with a graphical icon on the interactive GUI for the user to provide the guided gesture actuation at the wireless peripheral device inputting movement into the wireless peripheral device in the randomized target marker direction.

19. The information handling system of claim 17 further comprising:

the hardware processor executing computer readable program code of the user interaction guided gesture instruction system to present to a user with the interactive GUI a target marker and a moving matching marker for the user to provide the guided gesture actuation, via the wireless peripheral device, when the target marker and matching marker are aligned within the interactive GUI.

20. The information handling system of claim 19, further comprising:

the hardware processor executing computer readable program code of the user interaction guided gesture instruction system to present to a user with the interactive GUI a randomized sequence of numbers and an indicator placed at a location along the randomized sequence of numbers for the user to provide the guided gesture actuation at the wireless peripheral device to select the number in the randomized sequence of numbers indicated by the indicator.

* * * * *